United States Patent
Ryu et al.

(10) Patent No.: US 8,390,672 B2
(45) Date of Patent: Mar. 5, 2013

(54) MOBILE TERMINAL HAVING A PANORAMA PHOTOGRAPHING FUNCTION AND METHOD FOR CONTROLLING OPERATION THEREOF

(75) Inventors: Hye Jin Ryu, Seoul (KR); Moon Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 978 days.

(21) Appl. No.: 12/367,077

(22) Filed: Feb. 6, 2009

(65) Prior Publication Data

US 2010/0066810 A1 Mar. 18, 2010

(30) Foreign Application Priority Data

Sep. 12, 2008 (KR) .................. 10-2008-0090269

(51) Int. Cl.
*H04N 7/00* (2011.01)
(52) U.S. Cl. ........................................... 348/36
(58) Field of Classification Search ............... 348/36
See application file for complete search history.

(56) References Cited

U.S. PATENT DOCUMENTS

| | | | |
|---|---|---|---|
| 5,873,007 A | 2/1999 | Suarez | |
| 6,686,955 B1 | 2/2004 | Fields et al. | |
| 8,077,213 B2 | 12/2011 | Gulliksson | |
| 2001/0048465 A1 | 12/2001 | Toyofuku et al. | |
| 2004/0229646 A1 | 11/2004 | Cho | |
| 2005/0117024 A1 | 6/2005 | Lee | |
| 2006/0018547 A1 | 1/2006 | Ouchi | |

FOREIGN PATENT DOCUMENTS

| | | |
|---|---|---|
| CN | 1220543 A | 6/1999 |
| CN | 1551616 A | 12/2004 |
| CN | 1630304 A | 6/2005 |
| CN | 101010942 A | 8/2007 |
| EP | 0 810 776 A2 | 12/1997 |
| EP | 0 942 598 A2 | 9/1999 |
| EP | 1 480 436 A1 | 11/2004 |
| EP | 2 018 049 A2 | 1/2009 |
| WO | WO 2006/002796 A1 * | 12/2006 |

* cited by examiner

*Primary Examiner* — Robert B Harrell

(74) *Attorney, Agent, or Firm* — Birch, Stewart, Kolasch & Birch, LLP

(57) ABSTRACT

A method of controlling a mobile terminal, and which includes displaying a panorama guide including a lattice having at least two rows on a preview screen when a panorama photographing operation using a camera on the terminal is performed, sensing a motion of the terminal, and displaying a position guide indicating a photographing position of the terminal when performing the panorama photographing operation.

20 Claims, 24 Drawing Sheets

MOBILE TERMINAL HAVING A PANORAMA PHOTOGRAPHING FUNCTION AND METHOD FOR CONTROLLING OPERATION THEREOF

This application claims the benefit of Korean Patent Application No. 10-2008-0090269 filed in Korea on Sep. 12, 2008, the entire contents of which is hereby incorporated by reference.

BACKGROUND OF THE INVENTION

1. Field of the Invention

The present invention relates to a mobile terminal having a panorama photographing function and a method for controlling an operation of the mobile terminal.

2. Discussion of the Related Art

Terminals such as personal computers, laptop computers, cellular phones and the like now include a variety of features such as multimedia functions including the ability to capture pictures or moving images, play music, arrange image files, play games, receive broadcasting programs, etc.

Generally, terminals can be divided into mobile terminals and stationary terminals. Further, mobile terminals can be classified into handheld terminals and vehicle mounted terminals, for example.

In addition, because the terminals include a wireless Internet function and a multimedia function, the size of the display screen of the mobile terminal has been increasing. Thus, users can capture and display high picture quality images using their terminal. However, because the mobile terminal is small-sized, the user is limited to taking pictures within a narrow region through the camera.

Thus, to photograph an image in a wide region, the user must take a plurality of photographs covering the wide region, and then use their personal computer to combine the plurality of photographs into a single picture shown the wide region. This process is very inconvenient for the user.

SUMMARY OF THE INVENTION

Accordingly, one object of the present invention is to address the above-noted and other drawbacks of the related art.

Another object of the present invention to provide a mobile terminal and corresponding method for allowing a terminal user to photograph a plurality of pictures for constructing a panorama picture such that the plurality of pictures have an improved picture continuity.

Yet another object of the present invention to provide a mobile terminal and corresponding method for notifying a user of a most suitable photographing position.

Still another object of the present invention to provide a mobile terminal and corresponding method for notifying a user of a correct photographing position based on object data without using a subjective method such as the user using his or her eye to measure the correct photographing position.

To achieve these and other advantages and in accordance with the purpose of the present invention, as embodied and broadly described herein, the present invention provides in one aspect a method for controlling an operation of a mobile terminal having a panorama photographing function, and which includes displaying a panorama guide including a lattice having at least two rows on a preview screen when a photographing operation using a camera is performed, sensing a motion of the terminal, and displaying a position guide indicating a photographing position on the preview screen. Therefore, the user can be notified of a most suitable position for photographing a panorama picture and thus compose scenes for constructing the panorama picture more freely. In addition, the panorama guide may be overlaid onto the preview screen.

Further, one of the sections constructing the lattice of the panorama guide may be marked as a portion displaying the initially photographed image. Also, panorama photographing may be performed clockwise or counterclockwise from the section of the lattice, which corresponds to the initially photographed image. The order of photographing images for constructing a panorama picture may also be set by a user, and the position guide may include a predetermined horizontal guide capable of sensing the horizontally or forward-and-backward tilting state of the mobile terminal.

In another aspect, the present invention provides a method for controlling an operation of a mobile terminal having a panorama photographing function, and which includes combining a plurality of photographed images to construct a panorama picture, displaying the panorama picture, and displaying an omitted part of the panorama picture to facilitate a panorama photographing operation.

In still another aspect, the present invention provides a method for controlling an operation of a mobile terminal having a panorama photographing function, and which includes displaying a guide image corresponding to a predetermined portion of a first image previously photographed on a preview screen, splitting the preview screen into sections constructing a lattice having at least two rows, and displaying the first image and a currently photographed second image in sections of the lattice. Accordingly, a user can be guided to panorama photographing through a larger screen.

In another aspect, the present invention provides a method of controlling a mobile terminal, and which includes displaying a panorama guide including a lattice having at least two rows on a preview screen when a panorama photographing operation using a camera on the terminal is performed, sensing a motion of the terminal, and displaying a position guide indicating a photographing position of the terminal when performing the panorama photographing operation. The present invention also provides a corresponding mobile terminal.

In still another aspect, the present invention provides a method for controlling an operation of a mobile terminal, and which includes combining a plurality of photographed images into a panorama picture, displaying the panorama picture included at least one omitted part of the panorama picture, displaying a lattice guide over the displayed panorama picture, receiving an input corresponding to a selection of at least one section of the lattice that corresponds to the omitted part of the panorama picture, and photographing an image corresponding to the selected section of the lattice, and adding the photographed image corresponding to the selected section of the lattice with the plurality of combined photographed images to construct the panorama picture. The present invention also provides a corresponding mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incor

DETAILED DESCRIPTION OF THE EMBODIMENTS

Reference will now be made in detail to the preferred embodiments of the present invention, examples of which are illustrated in the accompanying drawings.

Figure 1:
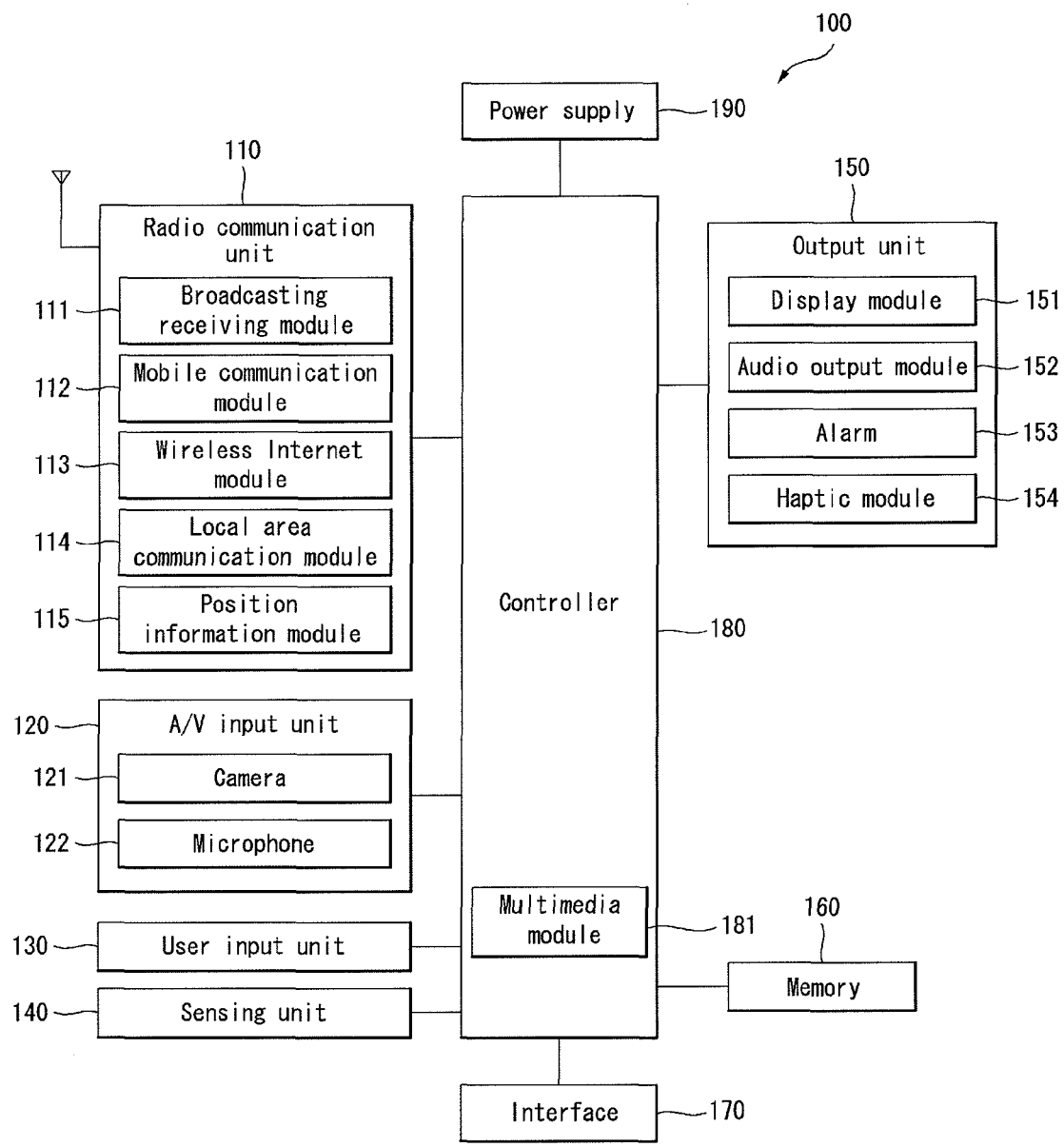
- FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter instance, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

Furthermore, the camera 121 can take panorama pictures. In general, a panorama picture is obtained by photographing a plurality of partial pictures using a camera while varying a photographing angle in one direction and connecting the plurality of partial pictures, which will be described later in detail.

The audio data can then be converted into a form that can be transmitted to a mobile communication base station through the mobile communication module 112 and output in the call mode. Further, the microphone 122 can employ various noise removal algorithms for removing noise generated when the external audio signal is received. In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

Furthermore, the sensing unit 140 can include a motion sensor that senses a motion to which an embodiment of the present invention is applied, in particular, acceleration, horizontally or inclination. The motion sensor can include an acceleration sensor or a terrestrial magnetism sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Figure 2A:
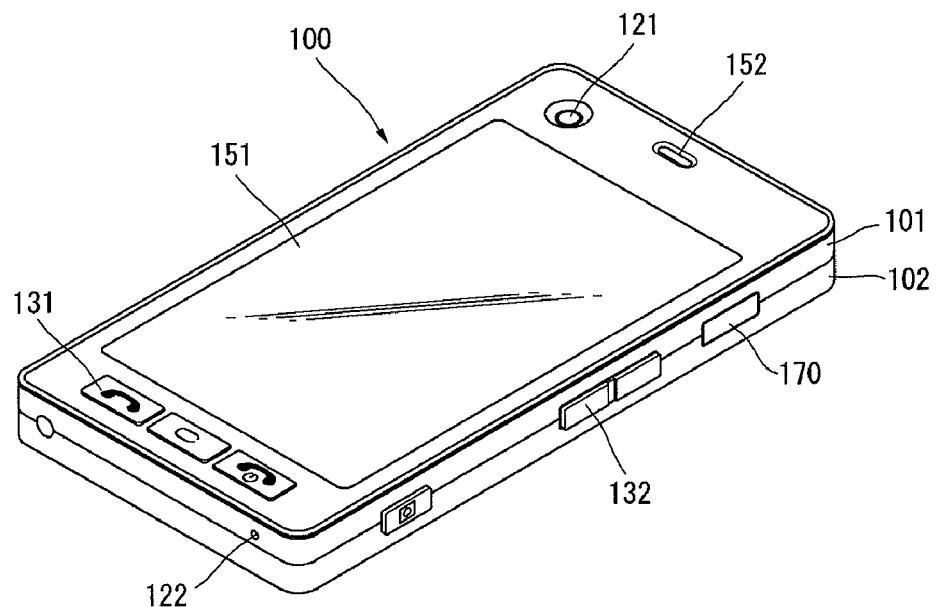
FIG. 2A is a front perspective view of the mobile terminal according to an embodiment of the present invention.

Next, FIG. 2A is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display unit 151, the audio output unit 152, the camera 121, a user input unit 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
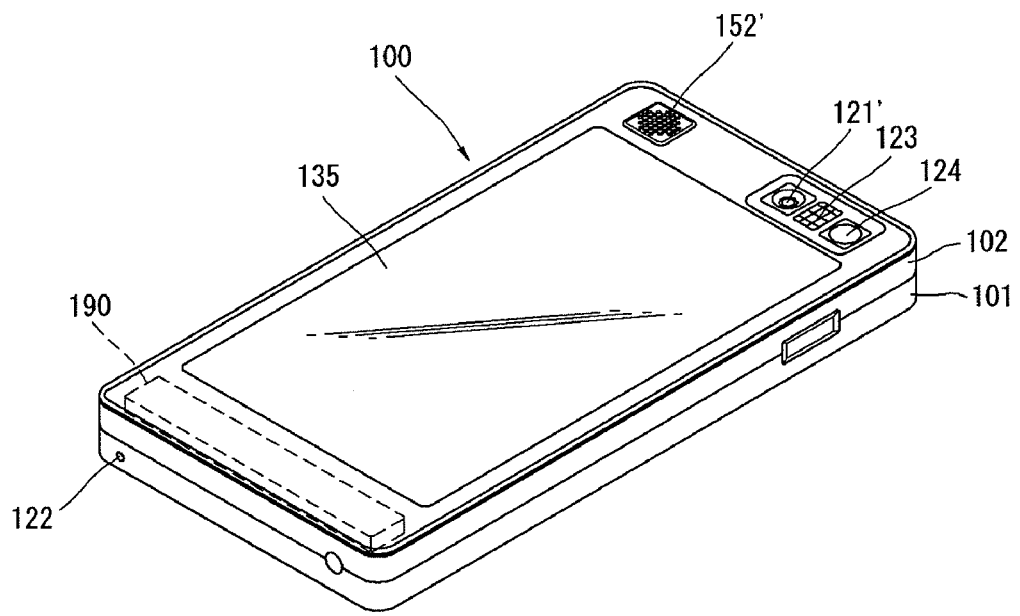
FIG. 2B is a rear perspective view of the mobile terminal according to an embodiment of the present invention.

Next, FIG. 2B is a rear perspective view of the handheld terminal shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2A.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2a and be used in a speaker phone mode when the terminal is used for a telephone call.

A broadcasting signal receiving antenna can also be additionally attached to a side of the terminal body in addition to an antenna for telephone calls. The antenna forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display module 151. In this instance, when the display module 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display module 151 behind the display module 151. The touch panel 135 can also be identical to or smaller than the display unit 151 in size.

The interoperations of the display unit 151 and the touch pad 135 will now be described with reference to FIGS. 3A and 3B. In more detail, FIGS. 3a and 3b are front views of the handheld terminal 100 and are used for explaining an operating state of the handheld terminal according to an embodiment of the present invention.

The display unit 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
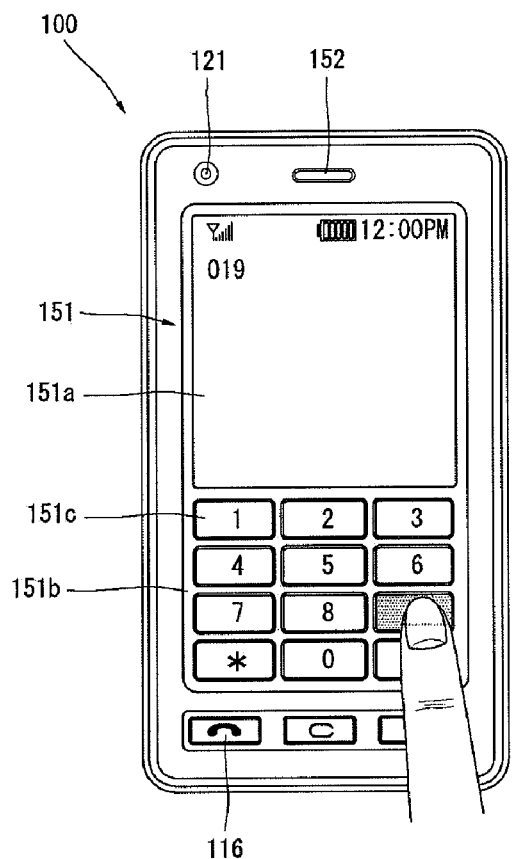
FIGS. 3A and 3B are front views of a handheld terminal for explaining an operation of the handheld terminal according to an embodiment of the present invention.
Figure 3B:
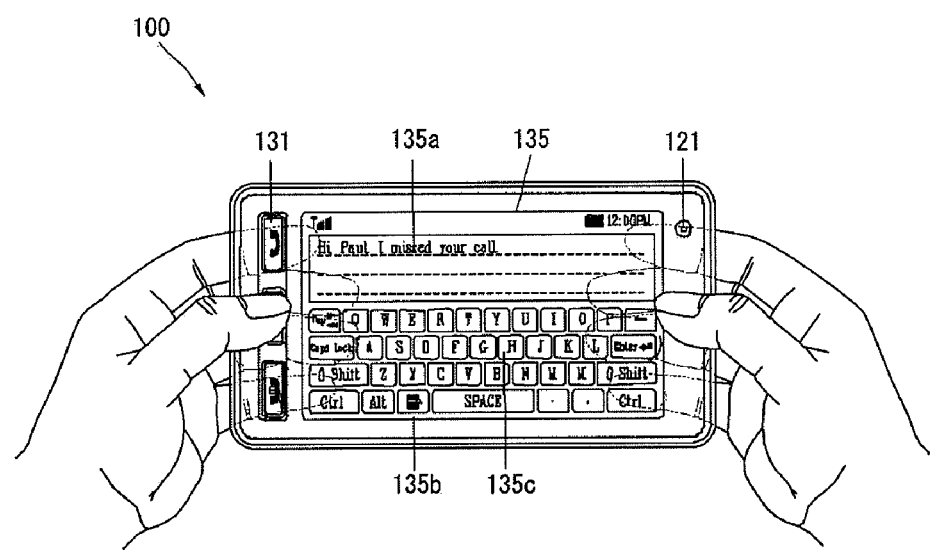

Further, FIG. 3A shows that touch applied to a soft key is input through the front side of the terminal body. The display unit 151 can be a single area or can be divided into a plurality of regions. In the latter instance, the display unit 151 is constructed such that the plurality of regions interoperate with each other.

For example, and as shown in FIG. 3A, an output region 151a and an input region 151b are respectively displayed in upper and lower parts of the display unit 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 116, a connection of a call corresponding to a telephone number displayed on the output region 151a is attempted.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display unit 151 is constructed such that an output image is converted according to the direction in which the terminal body is located.

Further, FIG. 3B shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135*b*. Further, in this embodiment, the soft keys 135*c* are arranged in the form of qwerty keys.

Thus, when the soft keys 135*c* are touched through the touch pad 135, the characters, numerals and symbols corresponding to the touched soft keys 135*c* are displayed on the output region 135*a*. Touch input through the touch pad 135 can prevent the soft keys 135*c* from being covered with user's fingers when the soft keys 135*c* are touched as compared to touch input through the display unit 151. Further, when the display unit 151 and the touch pad 135 are transparent, the user can see his or her fingers located behind the terminal body, and thus can select items by touching the backside or surface of the displayed keys 135*c*

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

The proximity sensor described with reference to FIG. 1 will now be explained in more detail with reference to FIG. 4. That is, FIG. 4 is a conceptual diagram used for explaining a proximity depth of the proximity sensor.

Figure 4:
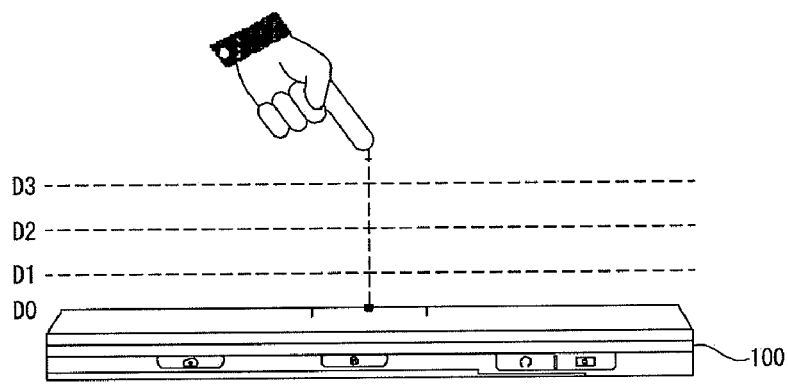
FIG. 4 is a conceptional view for explaining a proximity depth of a proximity sensor.

As shown in FIG. 4, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

Figure 5:
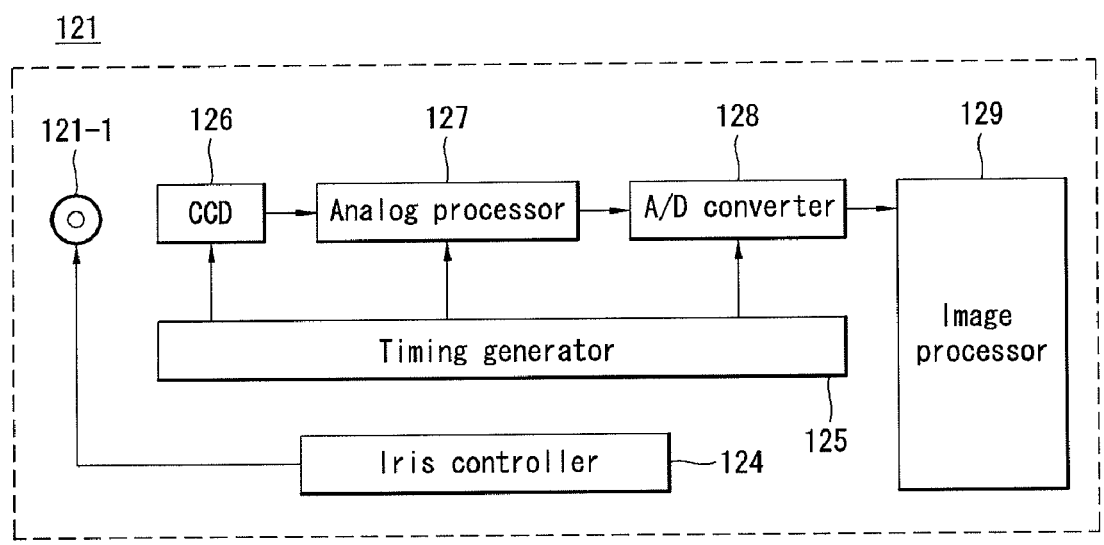
FIG. 5 is a block diagram of a camera illustrated in FIG. 1.

Next, FIG. 5 is a block diagram of the camera 121 illustrated in FIG. 1 according to one embodiment of the present invention. As shown, the camera 121 includes an iris controller 124, a timing generator 125, a charge coupled device (CCD) 126, an analog processor 127, an A/D converter 128 and an image processor 129. The iris controller 124 outputs a signal for controlling the quantity of incident light to a camera lens 121-1, and the timing generator 125 generates various timing signals used for operating the camera 121. In addition, the CCD 126 is an image sensor that converts an optical signal input through the camera lens 121-1 into an electric signal.

Further, the analog processor 127 latches a signal received from the CCD 126 and performs double sampling, gain flare, shading correction and potential gamma correction on the latched signal to output an analog processed image signal. To connect a plurality of images for constructing a panorama picture and to store the panorama picture in the memory 160 illustrated in FIG. 1, the analog processor 127 performs image processing operations such as aligning, stitching and blending to smoothly connect the images for constructing the panorama picture.

The A/D converter 128 converts the analog processed image signal into digital image data, and the image processor 129 receives the digital image data from the A/D converter 129 and performs various image processing operations including white balancing, data detection and gamma correction on the image signal. Furthermore, the image processor 129 compresses the processed video data and outputs the compressed video data.

In addition, the above-described components constructing the camera 121 of the mobile terminal 100 operate under the control of the controller 180, and image signals are stored in the form of a frame in the memory 160. The memory 160 also stores a program for executing a panorama photographing operation of the controller 180 and related information and outputs the information to the controller 180, if required.

Figure 6:
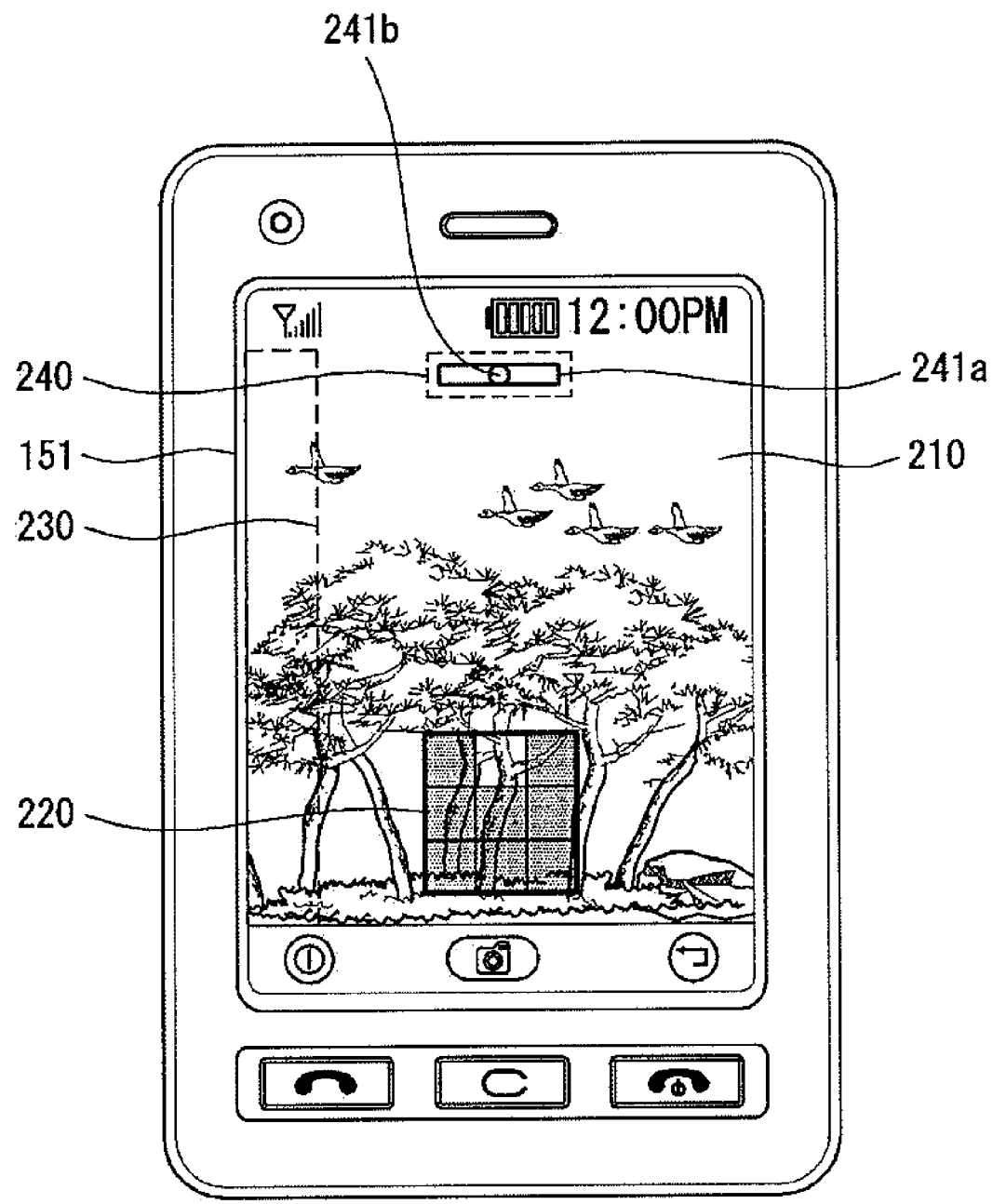
FIG. 6 is an overview of a display screen illustrating panorama photographing being performed according to an embodiment of the present invention.

Next, FIG. 6 is an overview of a display screen illustrating panorama photographing being performed on the terminal according to an embodiment of the present invention. As shown in FIG. 6, the display unit 151 includes a preview screen 210, a panorama guide 220, a guide image 230 and a position guide 240 for panorama photographing.

In addition, the preview screen 210 displays a currently photographed image on the display unit 151. Further, as shown in FIG. 6, the panorama guide 220, the guide image 230 and the position guide 240 are overlaid onto the preview screen 210. Also, the panorama guide 220 is displayed on the preview screen 210 and includes a lattice including a plurality of rows and columns. The lattice includes two-dimensional sections that display a previously photographed image and a currently photographed image.

In addition, the lattice of the panorama guide 220 can be set by a user such that the user can determine the number of photographed images constructing a panorama picture and spatial composition of the panorama picture. Furthermore, the user can determine the order of photographing images according to the spatial composition.

The guide image 230 can also be displayed on a predetermined region of the preview screen 210. In more detail, the controller 180 extracts a predetermined portion from a first image previously photographed to generate the guide image 230, and then displays the guide image 230 on the preview screen 210 on which a second image that will be photographed after the first image is displayed to assist the user in correctly photographing the second image. That is, the user can use the guide image 230 to take the next image.

In addition, the portion extracted as the guide image 230 from the first image can be determined in advance and correspond to 10 to 20% of the first image. As shown in FIG. 6, the portion extracted as the guide image 230 from the first image corresponds to a region near the edge of the first image, and which is located in a camera angle rotating direction. That is, if the camera angle is horizontally rotated from left to right to photograph images for constructing a panorama picture, the guide image 230 is extracted from the left edge of the first image.

Thus, the guide image 230 is preferably displayed on a region of the preview screen 210, which is located opposite to the camera angle rotating direction. That is, if the camera angle is rotated from right to left to photograph images for constructing a panorama picture, the guide image 230 is displayed on the right edge of the preview screen 210. Similarly, if the camera angle is vertically rotated from the bottom to the top to photograph images for constructing a panorama picture, the guide image 230 is displayed on the bottom edge of the preview screen 210. Accordingly, the controller 180 can display the guide image 230 on one of the top, bottom, left and right edges of the preview screen 210, because the panorama guide 220 includes a plurality of rows and columns.

Further, the position guide 240 includes a horizontal guide capable of sensing a horizontally or tilting state of the terminal and is displayed on a predetermined portion of the preview screen 240. As shown in FIG. 6, the horizontal guide can have a form of bar 241a that can include a predetermined figure such as a circle 241b.

In addition, the controller 180 compares the horizontally or tilting state of the terminal in the position for photographing the first image to the horizontally or tilting state of the terminal in the position for photographing the second image, and varies the size or position of the circle 241b of the position guide 240 based on a result of the comparison. Furthermore, the controller 180 can vary a color of the circle 241b based on a result of the comparison to notify the user of a most suitable photographing position.

Figure 7:
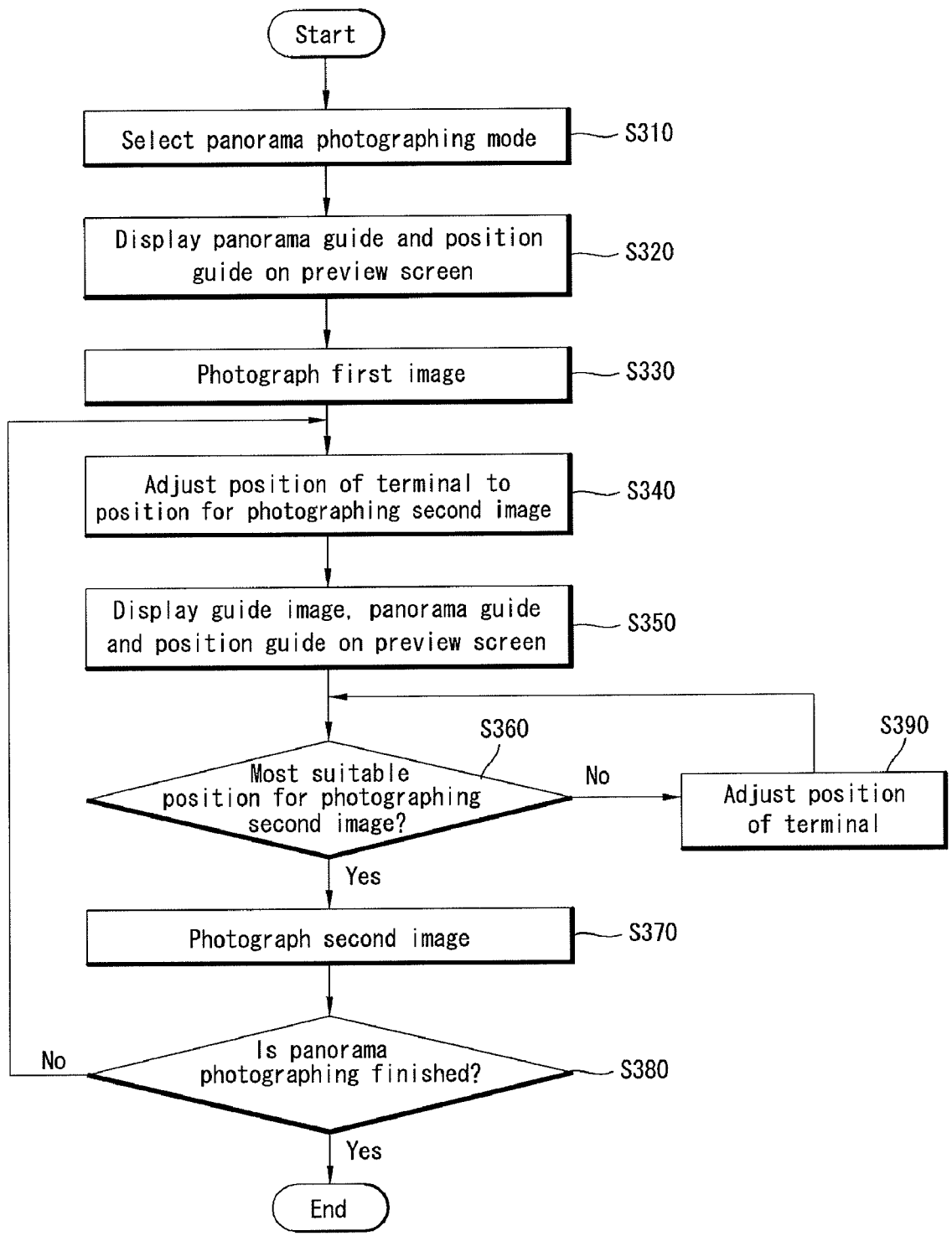
FIG. 7 is a flow chart illustrating a method for controlling an operation of a mobile terminal according to an embodiment of the present invention.

Next, FIG. 7 is a flow chart illustrating a method for controlling an operation of a mobile terminal having a panorama photographing function according to an embodiment of the present invention, and FIGS. 8A-8D are overviews of display screens illustrating preview images displayed when panorama photographing is performed according to an embodiment of the present invention. FIG. 1 will also be referred to throughout the rest of the description of the present invention.

As shown in FIG. 7, the user selects a panorama photographing mode from menu items for setting various functions of the mobile terminal (step S310). The user can select the panorama photographing mode using one of the operating units of the user input unit 130 or by touching a point of the touch screen of the display unit 151.

Figure 8A:
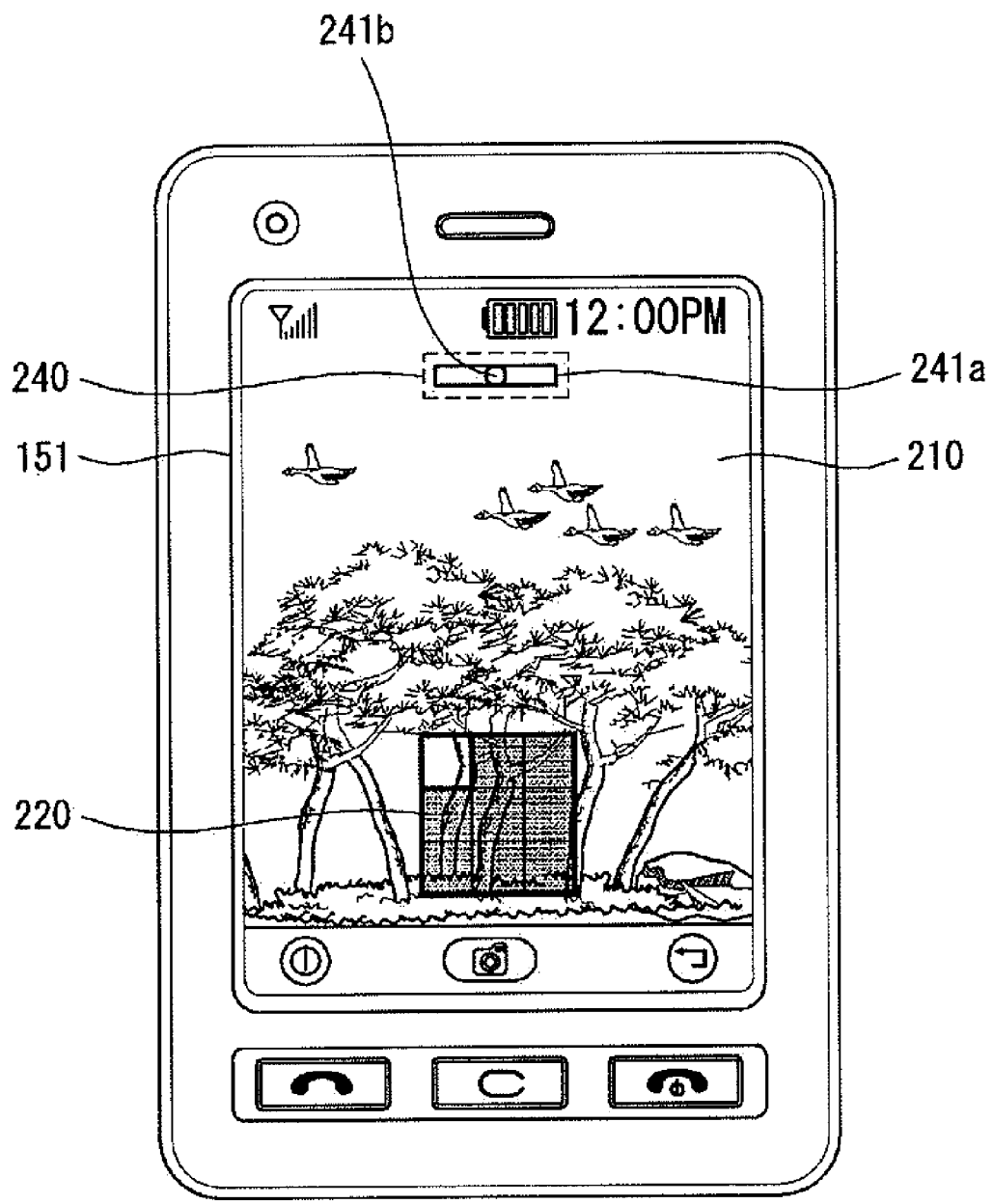
FIGS. 8A, 8B, 8C and 8D are overviews of display screens illustrating preview images displayed when a panorama photographing is performed according to an embodiment of the present invention.

Then, the controller 180 displays the panorama guide 220 and the position guide 240 on the preview screen 210 of the display unit 151 (step S320). FIG. 8A illustrates these features. Also, as shown in FIG. 8A, the controller 180 displays a currently viewed image input to the camera lens 121-1 on the preview screen 210. That is, the user can view the image to be photographed in this initial setting. Thus, because the image has not yet been captured (i.e., is only being viewed by the user as this time), the controller 180 does not display the guide image 230 on the preview screen 210.

Further, as shown in the example in FIG. 8A, the panorama guide 220 highlights a section of the lattice, which corresponds to a section of the viewed image that will be first photographed to construct a panorama picture. In addition, in this example, the panorama guide 220 includes a lattice having three horizontal sections and three vertical sections defined by three rows and three columns, and the section (1, 1) corresponding to the first row and the first column displays the image to be initially photographed. Then, as described in FIG. 7, the user captures or photographs the first image (step S330). As discussed above, the controller 180 then extracts a predetermined portion from the first image to generate the guide image 230.

Figure 8B:
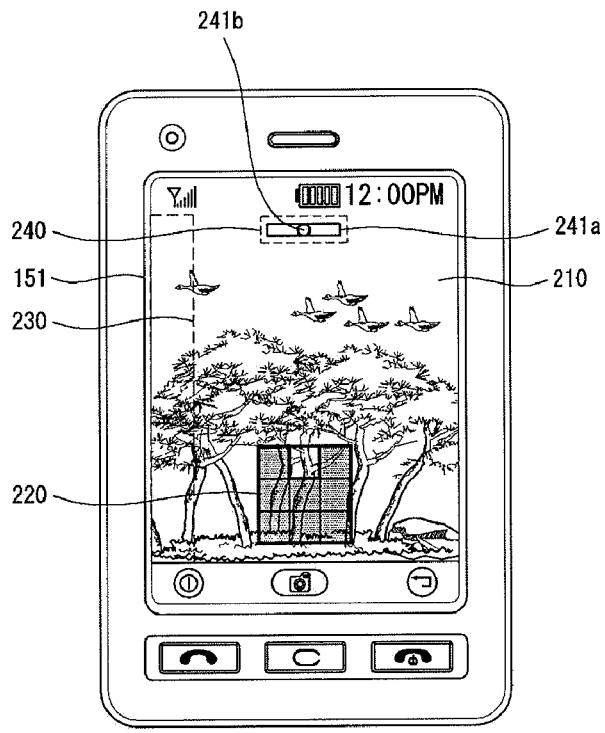

Next, the user adjusts or changes the position of the terminal to a position for photographing the second image next to the first image (step S340). Accordingly, the controller 180 displays the second image to be photographed, the panorama guide 220, the position guide 240 and the guide image 230 corresponding to the predetermined portion of the previously photographed first image on the preview screen 210 (step S350). FIG. 8B illustrates these features.

In addition, the controller 180 determines whether the current position of the terminal corresponds to a most suitable position for photographing the second image through the panorama guide 220, the guide image 230 and the position guide 240 displayed on the preview screen 210 (step S360). That is, the controller 180 checks a correlation between the guide image 230 and a predetermined portion of the second image, for example, image characteristic values, RGB hues, mean values of pixels in a block and value variances of the guide image 230 and the portion of the second image, and determines that the current position of the terminal corresponds to the most suitable position for photographing the second image when the correlation between the first image and the second image is higher than a predetermined amount, for example.

Furthermore, when the current position of the terminal corresponds to the most suitable position for photographing the second image, a section of the lattice of the panorama guide 220, which corresponds to the second image, is highlighted or the color of the highlight is changed if the section has been highlighted to indicate the most suitable position for photographing the second image. For example, when the camera angle is changed from the section (1, 1) of the lattice to the section (1, 2) of the lattice, and the current position of the terminal corresponds to the most suitable position for photographing the second image displayed on the preview screen 210, the section (1, 2) of the lattice of the panorama guide 220 is highlighted or the color of the highlight, for example, red, is changed to green, for example. Thus, the user is notified that the mobile terminal is in the most suitable position for photographing the second image.

Furthermore, the controller 180 compares the horizontally or tilting state of the terminal in the position for photographing the second image to the horizontally or tilting state of the terminal in the position for photographing the first image. The controller 180 also indicates the comparison result via the position, size and color of the circle 241b of the position guide 240 such that the second image can be photographed in the most suitable photographing position. The position guide 240 will be explained in more detail later.

Then, as shown in FIG. 7, when the mobile terminal is in the most suitable photographing position for photographing the second image (Yes in step S360), the user photographs the second image (step S370). In addition, when the current position of the mobile terminal does not correspond to the most suitable photographing position for photographing the second image (No in step S360), the user adjusts the position of the terminal to be located in the most suitable photographing position for photographing the second image (step S390).

Then, when all the images for constructing the panorama picture have been photographed (Yes in step S380), the panorama photographing operation is finished. When all of the images for constructing the panorama picture have not been photographed (No in step S380), the step S340 is repeated.

Figure 8C:
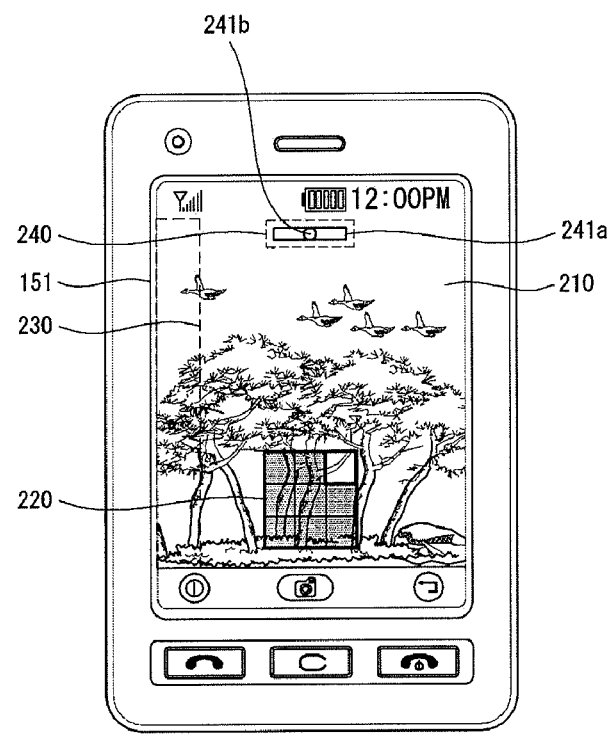
Figure 8D:
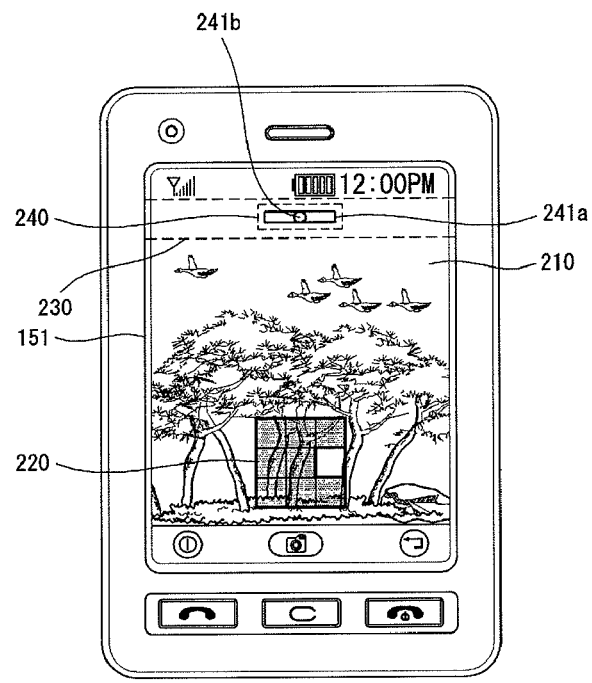

FIGS. 8A and 8B illustrate the first and second images being photographed, and FIG. 8C illustrates a third image to be currently photographed. As shown in FIG. 8C, the panorama guide 220, the position guide 240 and the guide image 230 are displayed on the preview screen 210. Also, the section (1, 3) of the panorama guide 220, which corresponds to the first row and the third column, is highlighted and the guide image 230 is extracted from a predetermined portion of the previously photographed second image.

Figure 9A:
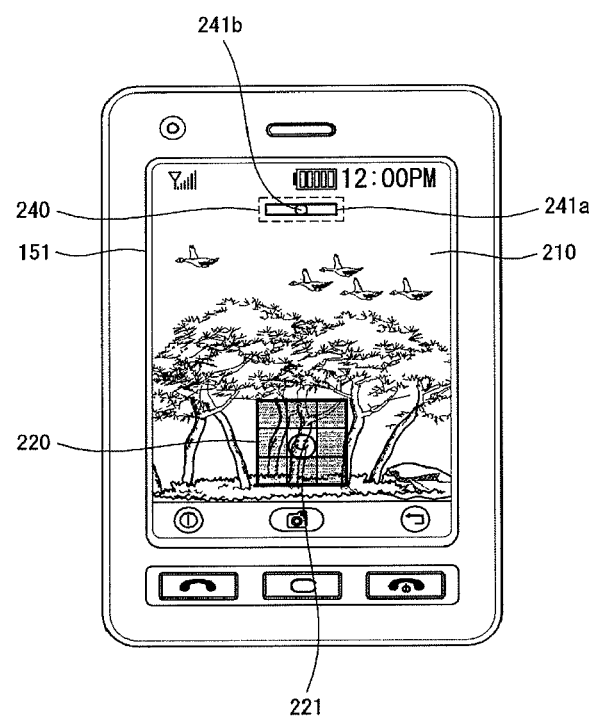
FIGS. 9A, 9B, 9C and 9D are overviews of display screens illustrating a panorama guide according to an embodiment of the present invention.

Next, FIGS. 9A-9D are overviews of display screens illustrating the panorama guide 220 according to an embodiment of the present invention. Referring to FIG. 9A, the panorama guide 220 allows the user to set a panorama photographing start point. In more detail, FIG. 9A illustrates that the user sets the section (2, 2) of the lattice, which corresponds to the second row and the second column, as the panorama photographing start point. The controller 180 can also display a predetermined icon 221 on the section corresponding to the panorama photographing start point (in this example, a smiley face icon is displayed as the starting point).

Figure 9B:
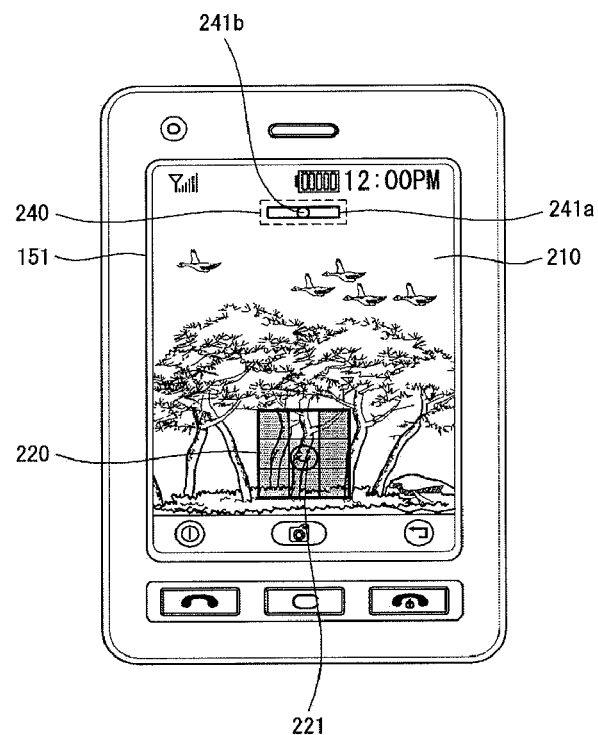

Referring to FIG. 9B, the controller 180 continuously displays the icon 221 on the section corresponding to the panorama photographing start point such that the user can easily recognize the panorama photographing start point during the overall panorama photographing process. Accordingly, the user can estimate a panorama photographing direction and photograph a plurality of images for constructing a panorama picture such that the images have picture continuity.

Figure 9C:
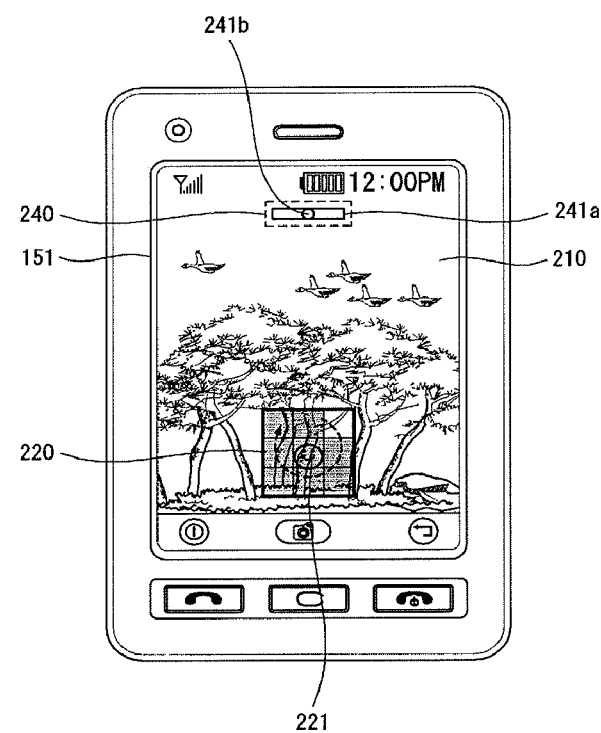
Figure 9D:
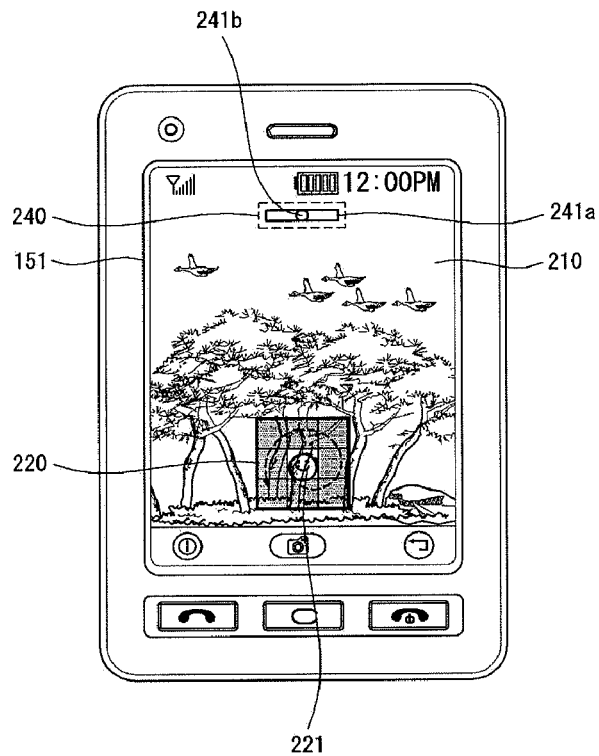

Referring to FIGS. 9C and 9D, the user can determine the order of photographing images for constructing the panorama picture according to spatial composition of the panorama picture. That is, the user sets the panorama photographing start point first, and then photographs images corresponding to sections of the lattice clockwise (FIG. 9C) or counterclockwise (FIG. 9D) based on the section corresponding to the panorama photographing start point to determine an image in the position closest to the previously photographed image as the next image to be photographed.

Figure 10A:
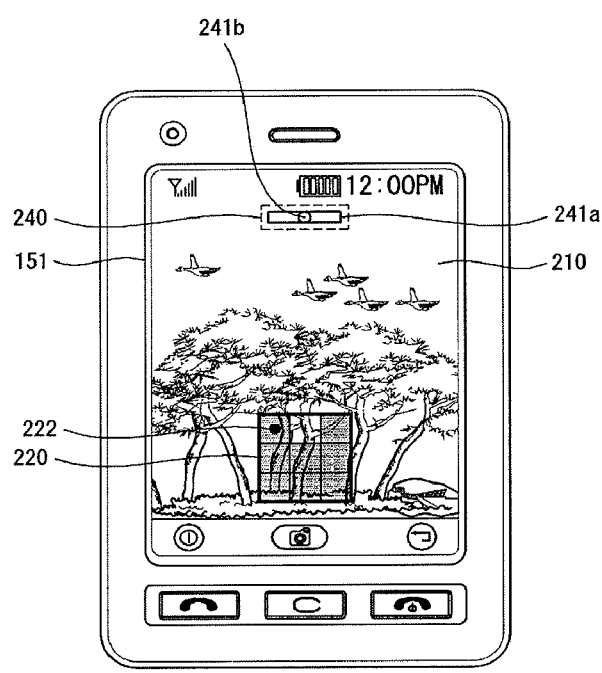
FIGS. 10A, 10B and 10C are overviews of display screens illustrating a panorama guide according to another embodiment of the present invention.
Figure 10B:
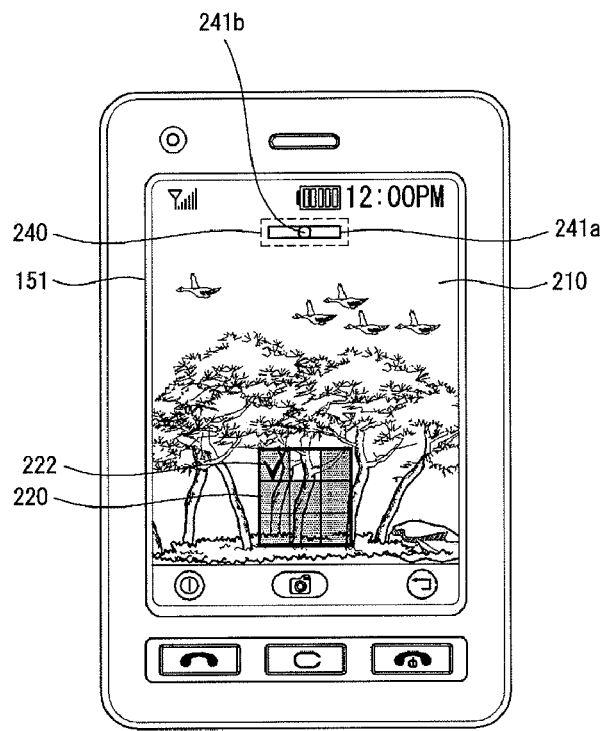
Figure 10C:
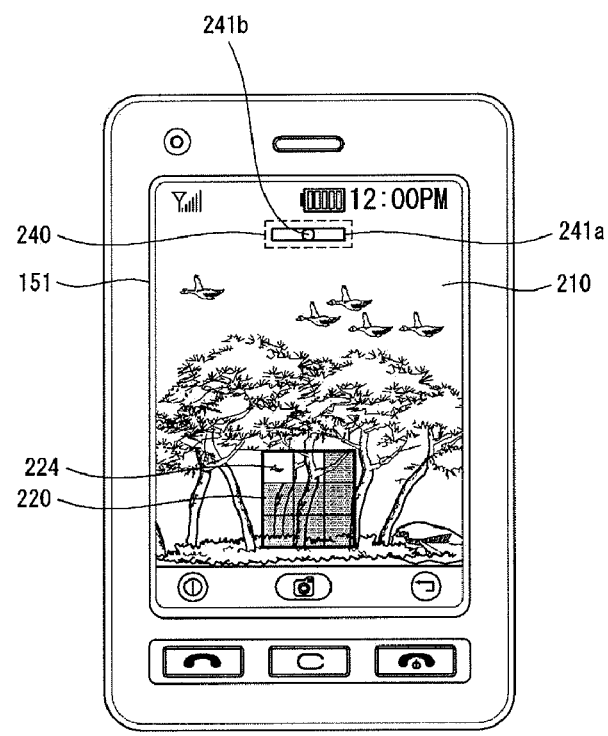

Next, FIGS. 10A-10C are overviews of display screens illustrating the panorama guide 220 according to another embodiment of the present invention. In more detail, the lattice of the panorama guide 220 in FIGS. 10A-10C displays a scene previously photographed, a scene that will be photographed in the future and a scene to be currently photographed in different manners (figures, icons, characters, images and colors).

For example, the controller 180 can mark the section (1, 1) of the lattice of the panorama guide 220 with a circle 222 (FIG. 10A) or a check 222 (FIG. 10B), which indicates a previously photographed image. FIG. 10C illustrates the controller 180 displaying a previously photographed image 224 in the section (1, 1) of the lattice.

Figure 11:
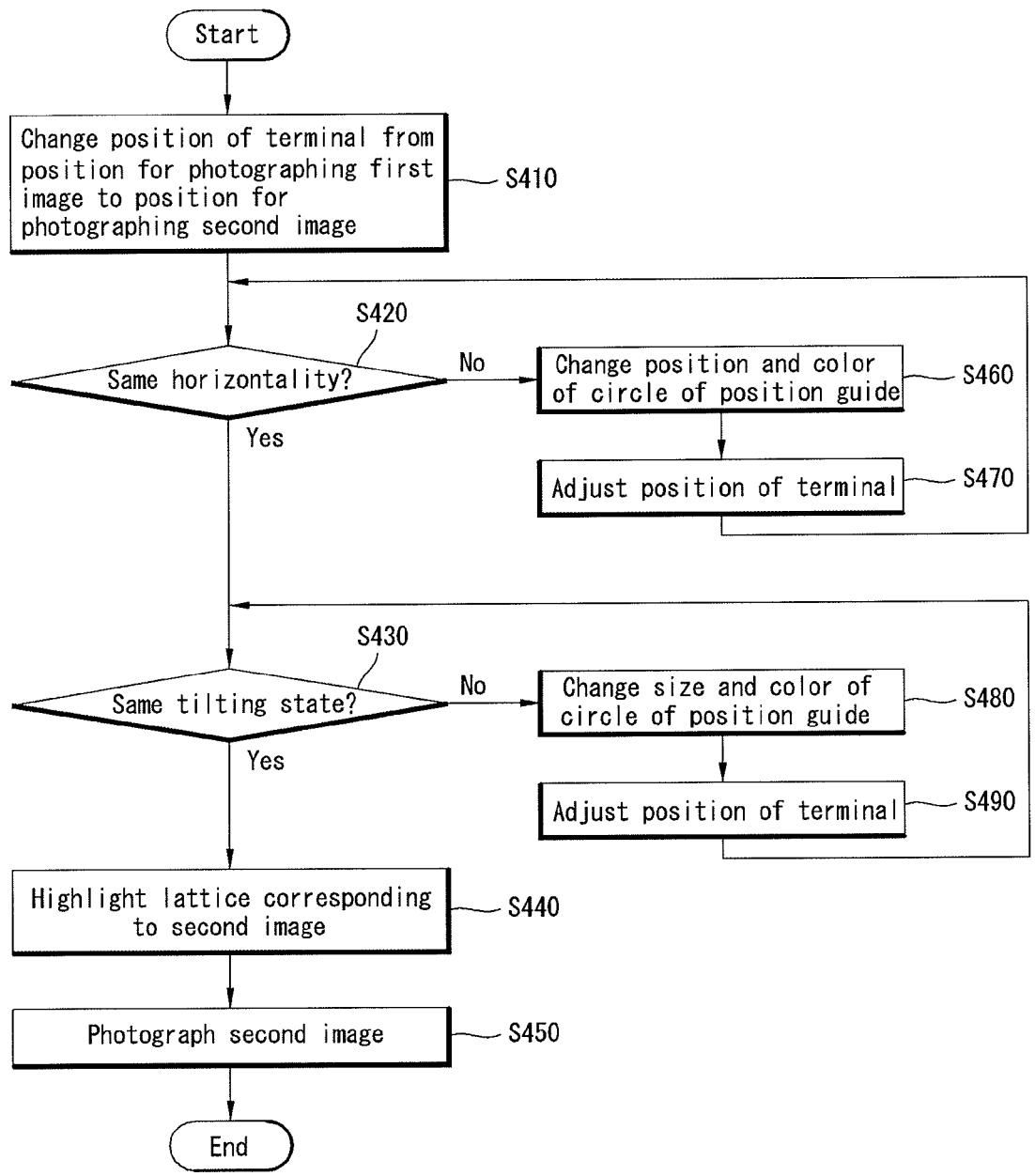
FIG. 11 is a flow chart illustrating an operation of a position guide in a method for controlling an operation of the mobile terminal according to an embodiment of the present invention.
Figure 12A:
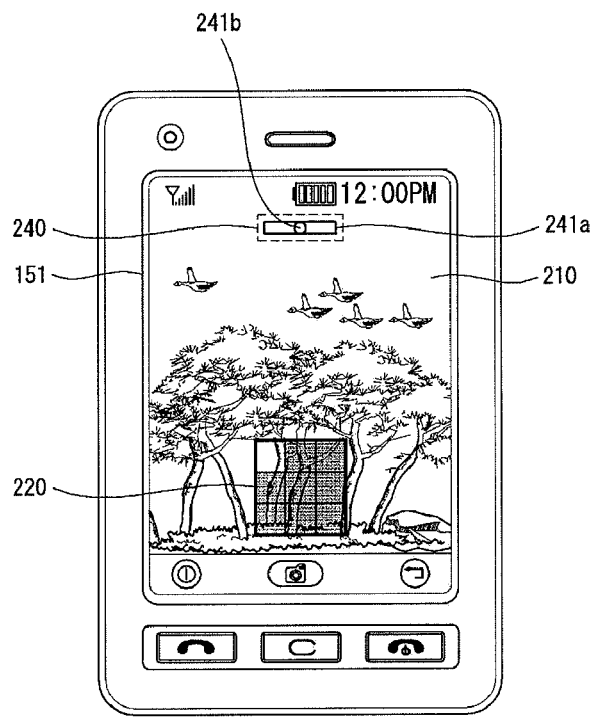
FIGS. 12A and 12B are overviews of display screens illustrating display states of a position guide according to a variation in a horizontally of the mobile terminal when panorama photographing is performed according to an embodiment of the present invention.
Figure 12B:
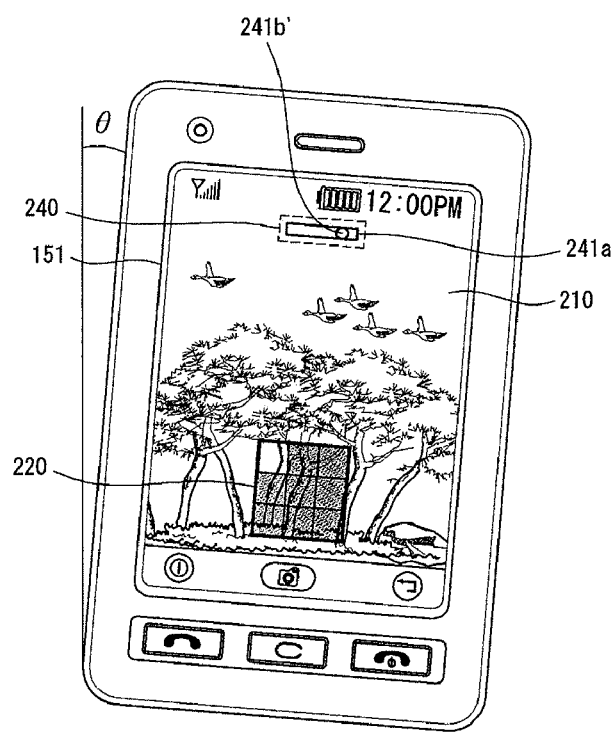

Next, FIG. 11 is a flow chart illustrating an operation of the position guide 240 according to an embodiment of the present invention, FIGS. 12A and 12B are overviews of display screens illustrating display states of the position guide according to a variation in the horizontally of the terminal when panorama photographing is performed according to an embodiment of the present invention, and FIGS. 13 and 14A-14C are overviews of display screens illustrating display states of the position guide according to a tilting state of the terminal when panorama photographing is performed according to an embodiment of the present invention.

In addition, the operation of the position guide 240 illustrated in FIG. 11, corresponds to the step S360 of determining whether the current position of the terminal corresponds to a most suitable position for photographing the second image illustrated in FIG. 7.

Referring to FIGS. 11, 12A and 12B, the position of the terminal is changed from the position for photographing the first image to the position for photographing the second image (step S410). Then, the controller 180 compares the horizontally of the terminal in the position for photographing the first image to the horizontally of the terminal in the position for photographing the second image (step S420). When the horizontally of the terminal in the position for photographing the first image corresponds to the horizontally of the terminal in the position for photographing the second image (Yes in step S420), the controller 180 displays the circle 241b of the position guide 240 at the center of the bar 241a. The controller 180 can also display the circle 241b for the second image to have the same color as that of the circle 241b when the first image is photographed. FIG. 12A illustrates the circle 241b having the same color and being in the same position.

However, when the motion sensor senses that the horizontally of the terminal in the position for photographing the second image is varied from the horizontally of the terminal in the position for photographing the first image by a predetermined angle θ (No in step S420), the controller 180 displays or locates the circle 241b' of the position guide 240 at a distance from the center of the bar 241a by the horizontally variation, as illustrated in FIG. 12B. For example, when the terminal is tilted to the right from the state shown in FIG. 12A to the state shown in FIG. 12B, the controller 180 locates the circle 241b' of the position guide 240 on the right of the bar 241a.

Furthermore, the controller 180 can also change the color of the circle 241b' of the position guide 240 from red to green, when the circle 241b' of the position guide 240 is located at a distance from the center of the bar 241a such that the user is notified that the current position of the terminal does not correspond to the most suitable position for photographing the second image (step S460). Then, when the color of the circle 241b' of the position guide 240 is changed in the step S460, the user can adjust the position of the terminal such that the terminal is located in the most suitable position for photographing the second image (step S470). Therefore, the user can easily recognize a variation in the horizontally of the terminal through the position and color of the circle 241b' of the position guide 240, and can easily find the most suitable photographing position for photographing the second image next to the first image when panorama photographing is performed.

In addition, the controller 180 also compares a forward-and-backward tilting state of the terminal in the position for photographing the second image to a tilting state of the terminal in the position for photographing the first image (step S430). When the controller 180 determines the two tilting states correspond to each other (Yes in step S430), the controller 180 can display the color and size of the circle 241b of the position guide 240 when the second image is photographed to correspond to those of the circle 241b when the first image is photographed, as illustrated in FIG. 14A.

However, when controller 180 determines the terminal position for photographing the second image tilts forward or backward from the position for photographing the first image (No in step S430), the controller 180 changes the size and color of the circle 241*b* of the position guide 240 (step S480). For example, when the motion sensor senses that the terminal position for photographing the second image tilts forward by a predetermined angle θ1, as illustrated in FIG. 13, the controller 180 displays the circle 241*b*' of the position guide 240 to be larger than the circle 241*b* illustrated in FIG. 14A, as illustrated in FIG. 14B.

Figure 13:
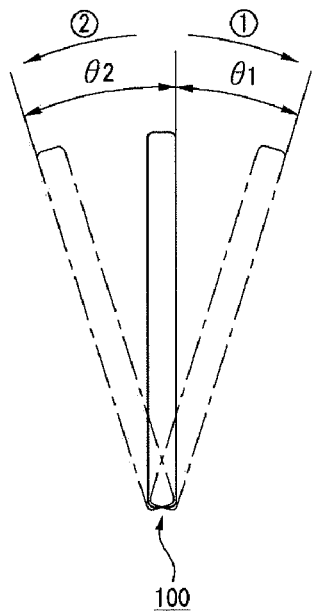
FIGS. 13, 14A, 14B and 14C are overviews of display screens illustrating display states of a position guide according to a tilting state of the mobile terminal when panorama photographing is performed according to an embodiment of the present invention.
Figure 14A:
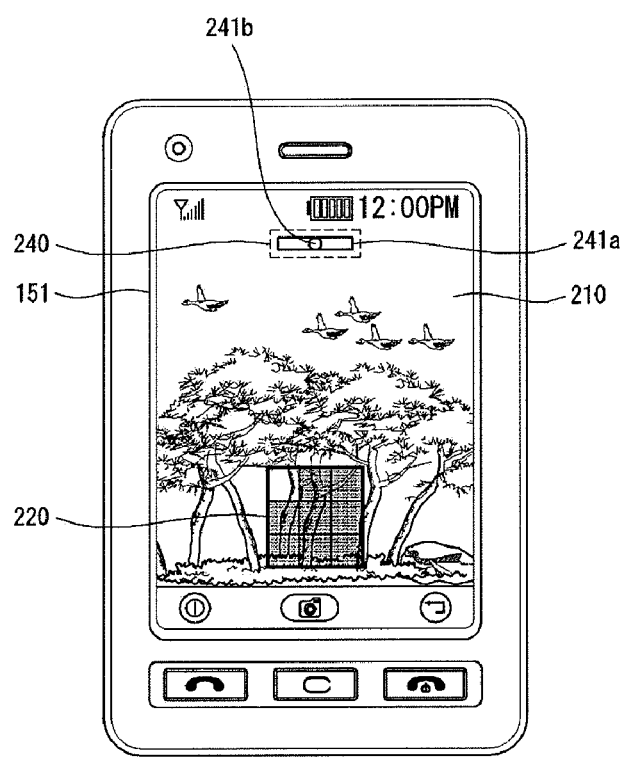
Figure 14B:
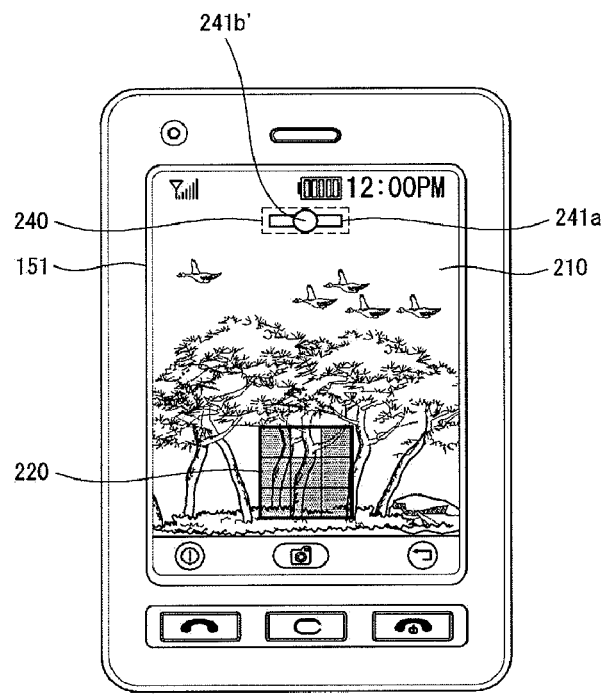
Figure 14C:
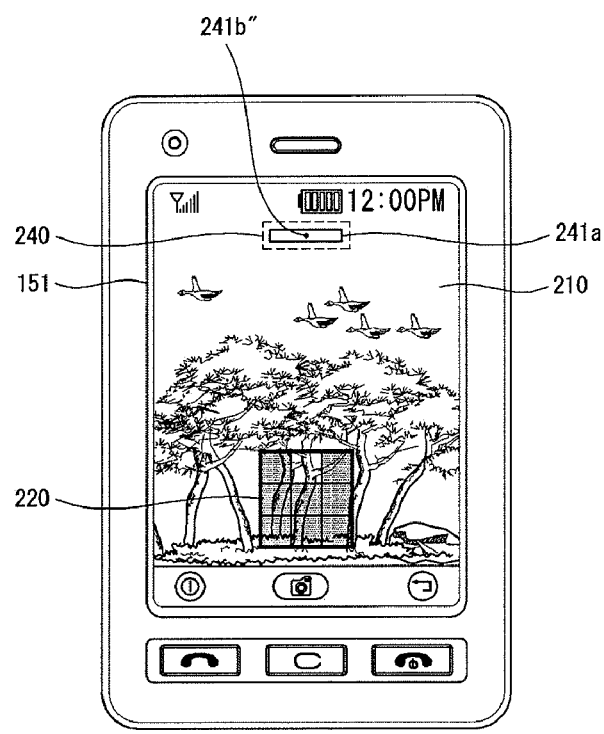

In addition, when the motion sensor senses that the terminal position for photographing the second image tilts backward by a predetermined angle θ2, as illustrated in FIG. 13, the controller 180 changes the circle 241*b*" of the position guide 240 to be smaller than the circle 241*b* illustrated in FIG. 14A, as illustrated in FIG. 14C. Furthermore, when the controller 180 changes the size of the circle 241*b*" of the position guide 240, the controller 180 can also change the color of the circle 241*b*" of the position guide from green to red to inform the user that the current position of the terminal does not correspond to the most suitable photographing position for photographing the second image.

Further, when the size and color of the circle 241*b* of the position guide 240 are changed in the step S480, the user adjusts the position of the terminal such that the terminal is located in the most suitable photographing position for photographing the second image (step S490). Therefore, the user can easily recognize a tilting state of the terminal through the size and color of the circle 241*b* of the position guide 240, and can easily find the most suitable photographing position for photographing the second image following the first image.

Also, when the controller 180 determines the current position of the terminal corresponds to the most suitable photographing position for photographing the second image in the steps S420 and S430, the controller 180 highlights the lattice corresponding to the second image (S440), and the user can photograph the second image (step S450). Also, even though the step S420 is performed before the step S430 in the present embodiment of the invention, the step S430 can be performed first and then the step S420 or the steps S420 and S430 can be performed simultaneously.

Next, FIGS. 15A-15D are overviews of display screens illustrating the panorama guide according to another embodiment of the present invention. In this embodiment, a variation in an acceleration value of the mobile terminal when the mobile terminal is moved for panorama photographing is sensed through the motion sensor of the sensing unit 140 to move a highlight of the lattice of the panorama guide 220. Further, position values corresponding to acceleration variations when the mobile terminal is moved can be previously stored in the memory 160.

Figure 15A:
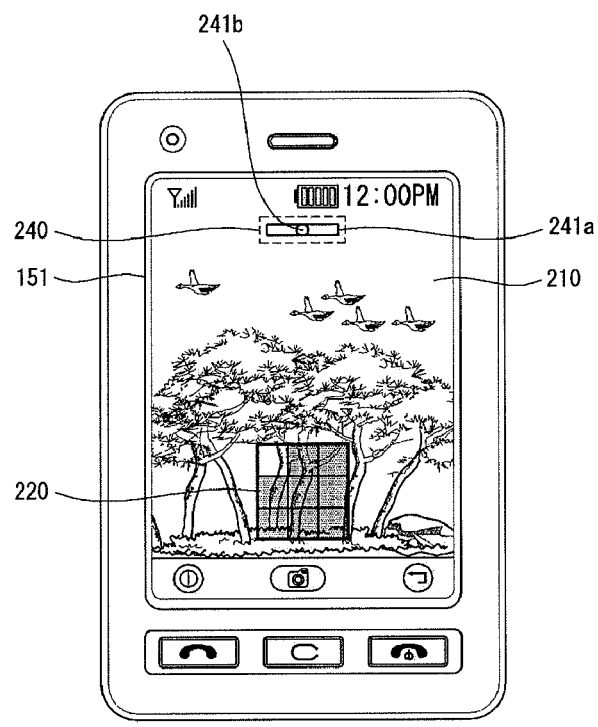
FIGS. 15A, 15B, 15C and 15D are overviews of display screens illustrating a panorama guide according to another embodiment of the present invention.
Figure 15B:
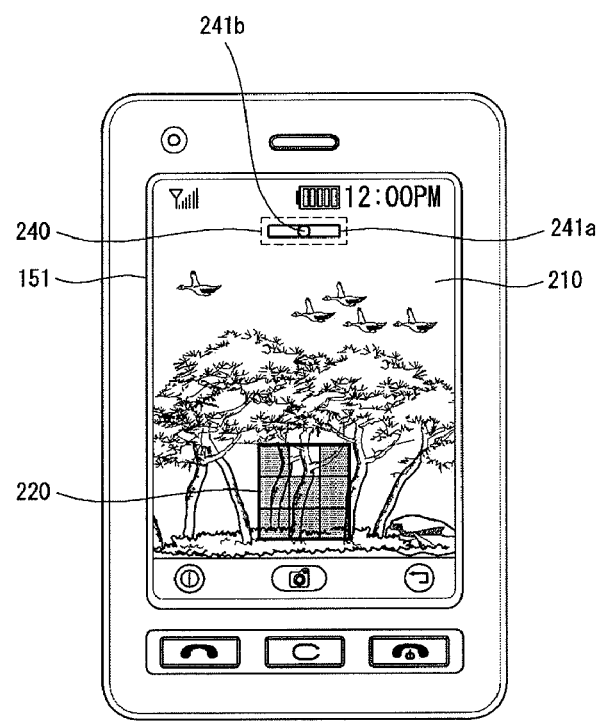

Referring to FIG. 15A, the section (1,1) of the lattice of the panorama guide 220, which corresponds to the previously photographed first image, is highlighted. The motion sensor then senses an acceleration variation of the mobile terminal when the mobile terminal is moved from the position for photographing the first image to the position for photographing the second image. Thus, when the controller 180 determines the mobile terminal has moved to the right in order to photograph the second image, the controller 180 moves the highlight from the section (1, 1) to the section (1, 2), as illustrated in FIG. 15B. Further, when the sensed acceleration variation is large, the highlight can be directly moved from the section (1, 1) to the section (1, 3) of the lattice.

Figure 15C:
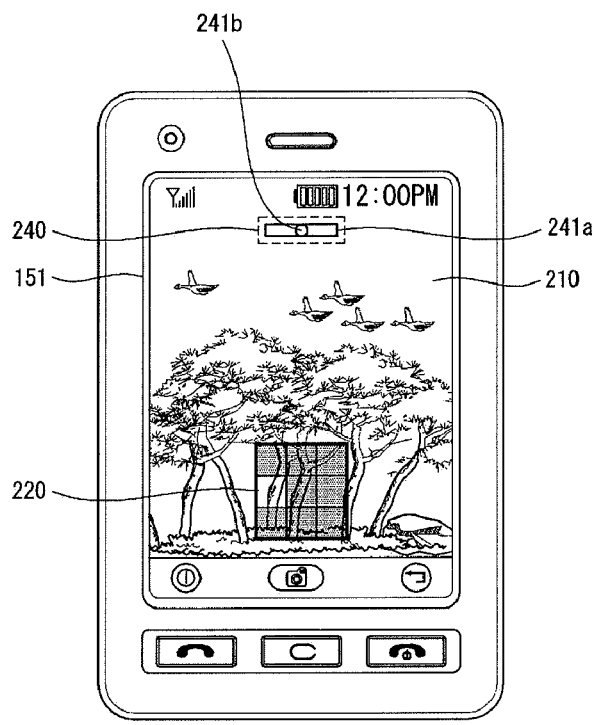
Figure 15D:
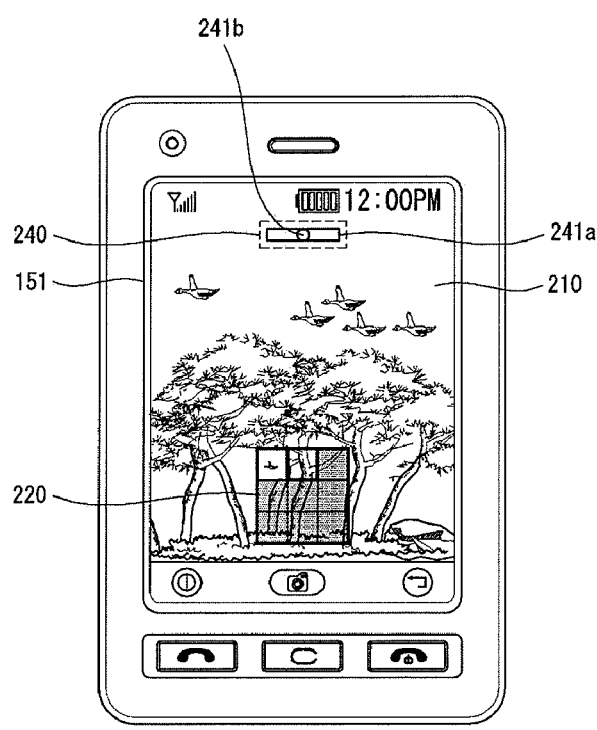

In addition, when the controller 180 determines the mobile terminal has moved to the bottom in order to photograph the second image, the controller 180 can move the highlight from the section (1, 1) of the lattice to the section (2, 1) of the lattice, as illustrated in FIG. 15C. Similarly, when the controller 180 determines the mobile terminal has moved downward and to the right, the controller 180 can move the highlight from the section (1, 1) of the lattice to the section (2, 2) of the lattice, as illustrated in FIG. 15D.

In addition, when the controller 180 determines there is no section of the lattice that corresponds to the acceleration variation, the controller 180 determines that the photographing angle is out of the range of the panorama guide 220 and notifies the user. Further, the controller 180 can notify the user through visual, auditory and tactile methods such as vibration and sound. Furthermore, when the controller 180 determines the mobile terminal is located out of the range of the panorama guide 220, the controller 190 can control the mobile terminal such that a photographing operation can not be performed (e.g., preventing the operation of a shutter key).

Figure 16A:
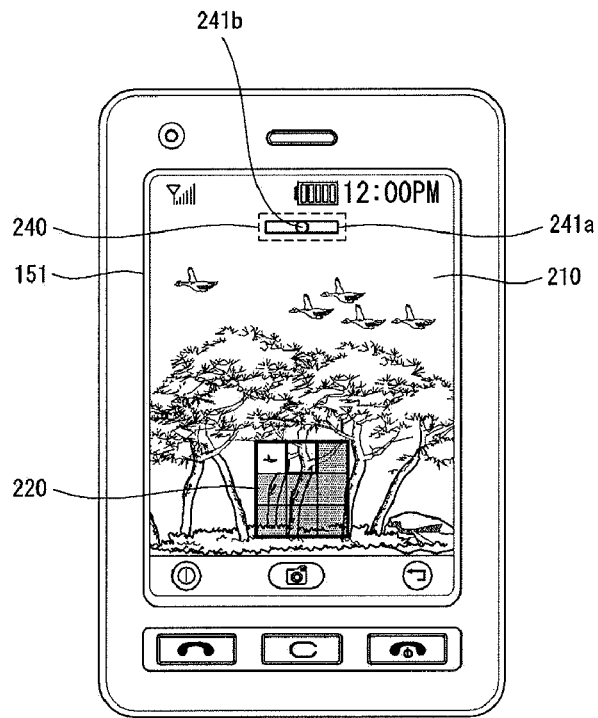
FIGS. 16A and 16B are overviews of display screens illustrating a change of display images of a preview screen and a panorama guide in a mobile terminal according to another embodiment of the present invention.
Figure 16B:
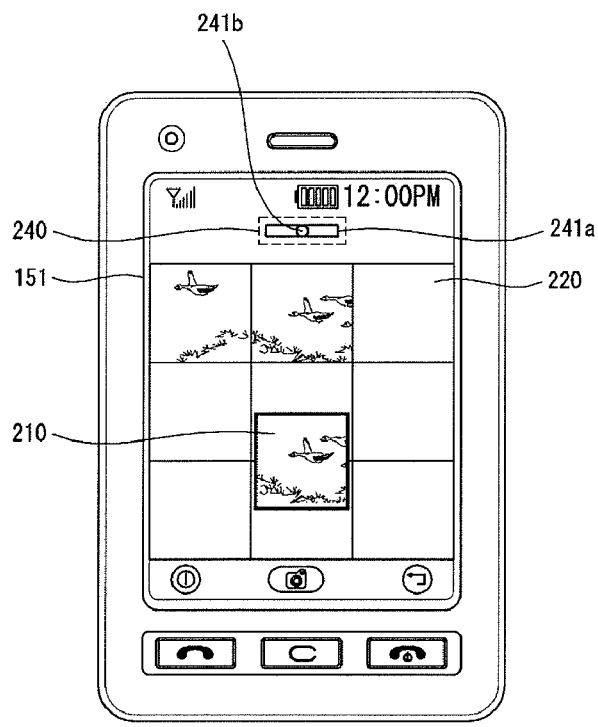

Next, FIGS. 16A and 16B are overviews of display screens illustrating a change of display images of the preview screen 210 and the panorama guide 220 according to an embodiment of the present invention. Referring to FIG. 16A, the panorama guide 220 is overlaid onto a predetermined portion of the preview screen 210. However, the user may want to know to what extent the panorama photographing operation is performed through a larger screen.

In this instance, the user can select one of keys of the user input unit 130 or touch a predetermined point on the display unit 151 to change display images of the preview screen 210 and the panorama guide 220. In more detail, FIG. 16B is an overview of a display screen illustrating a change of display images of the preview screen 210 and the panorama guide 220.

Referring to FIG. 16B, the controller 180 displays the panorama guide 220 including the lattice having three rows and three columns in the overall area of the display unit 151 and overlays the preview screen 210 onto a predetermined region of the panorama guide 220 in a size corresponding to the size of the panorama guide 220 illustrated in FIG. 16A.

In addition, the sections of the lattice display previously photographed images and the preview screen 210 displays a currently photographed image. Thus, the user can change the display of the preview screen 210 and the panorama guide 220 to confirm to what extent the panorama photographing operation is performed and whether images are correctly photographed through a larger screen.

Figure 17A:
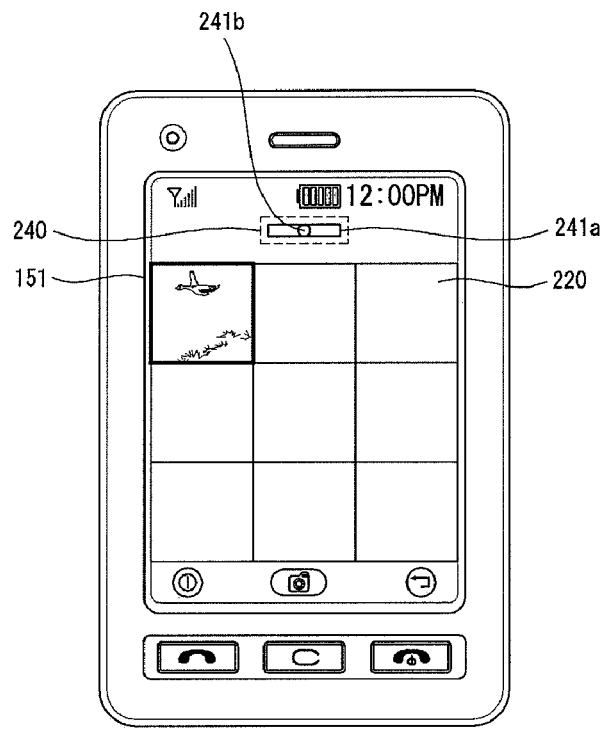
FIGS. 17A, 17B and 17C are overviews of display screens illustrating compositions of images when panorama photographing is performed according to another embodiment of the present invention.
Figure 17B:
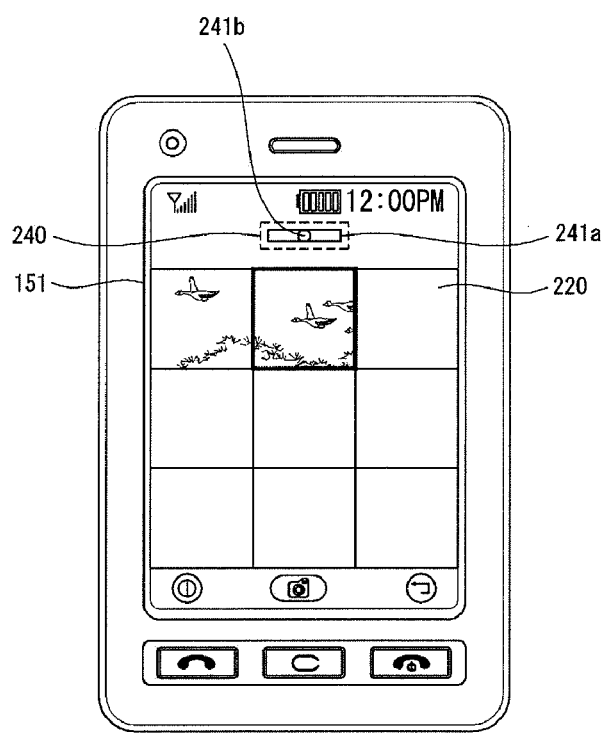
Figure 17C:
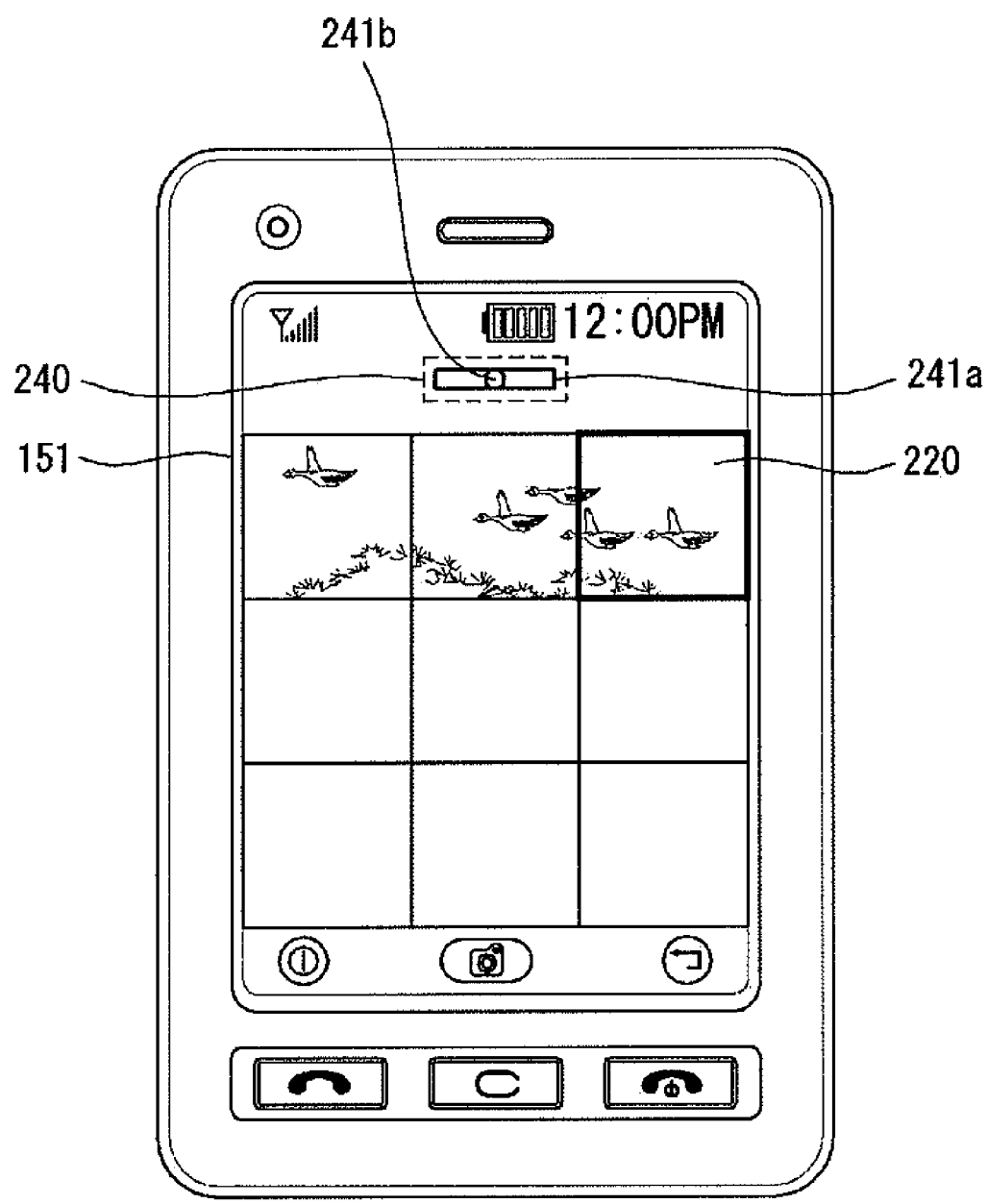

Next, FIGS. 17A-17C are overviews of display screens illustrating compositions of images displayed on the display unit when panorama photographing is performed according to an embodiment of the present invention. Referring to FIGS. 17A-17C, the preview screen of the display unit 151 is displayed through the panorama guide 220, distinguished from the preview screen illustrated in FIG. 6.

That is, the display unit 151 is split into sections constructing a lattice, and a highlighted section is used for the preview screen and other sections are used to display previously photographed images. Further, the guide image (not shown) and the position guide 240 can be displayed on the panorama guide 220 in order to assist the user in determining a correct panorama photographing position.

Figure 18:
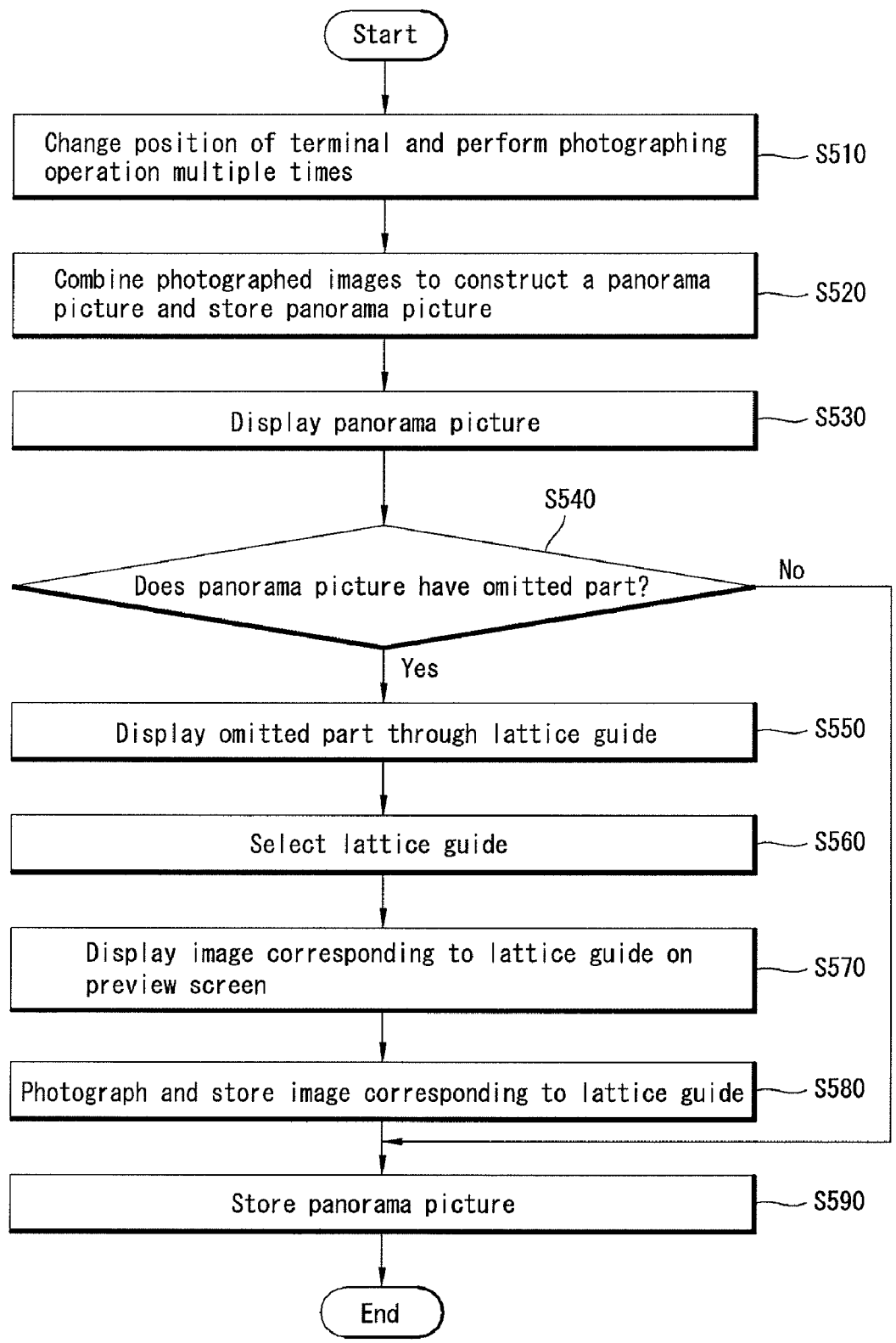
FIG. 18 is a flow chart illustrating a method for controlling an operation of a mobile terminal according to another embodiment of the present invention.

FIG. 18 is a flow chart illustrating a method for controlling an operation of the mobile terminal having a panorama photographing function according to an embodiment of the present invention, and FIGS. 19A-19D are overviews of display screens illustrating preview images displayed when panorama photographing is performed according to an embodiment of the present invention.

Figure 19A:
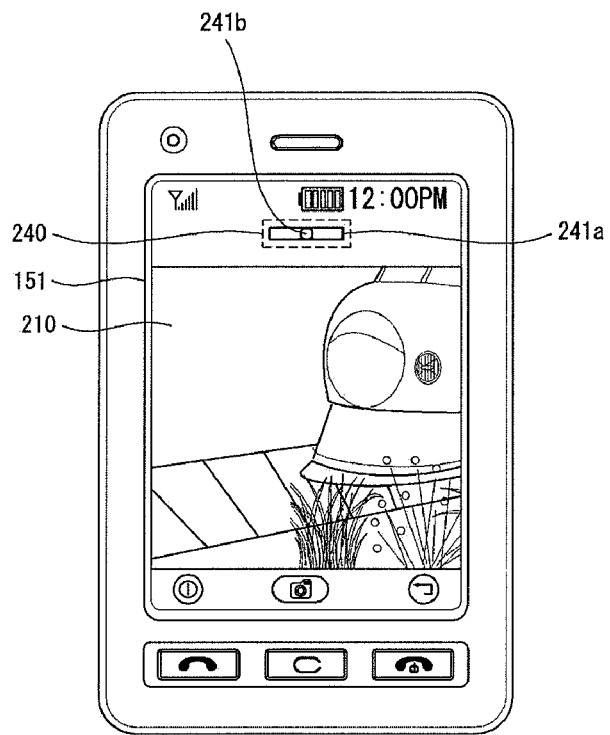
FIGS. 19A, 19B, 19C and 19D are overviews of display screens illustrating preview images displayed when panorama photographing is performed according to another embodiment of the present invention.
Figure 19B:
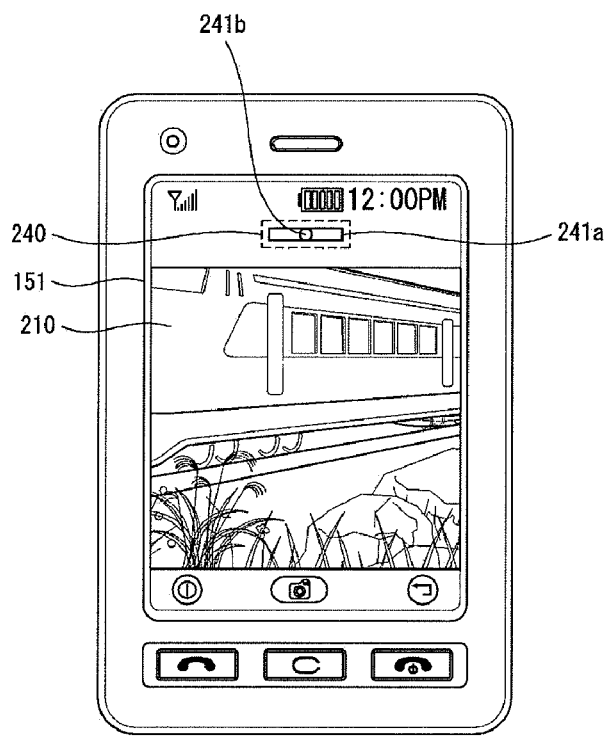
Figure 19C:
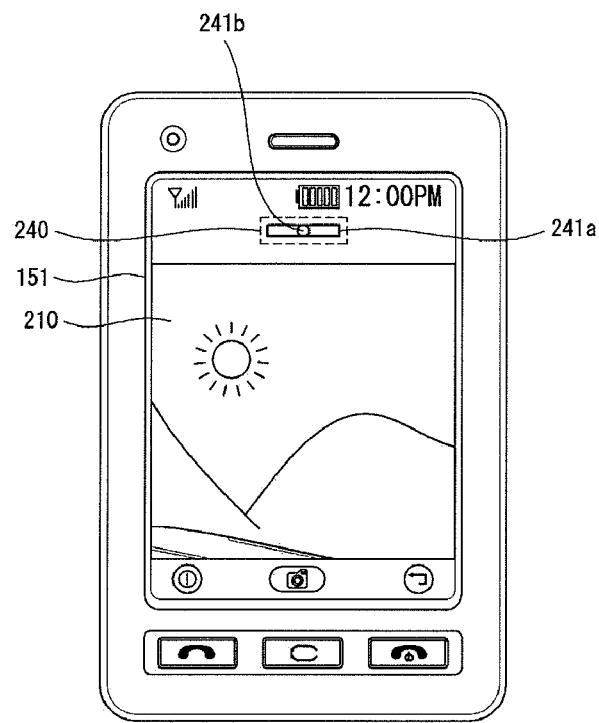

Referring to FIGS. 18 and 19A-19C, the user uses the mobile terminal to perform a photographing operation multiple times while changing the position thereof to photograph a plurality of images (step S510). At this time, the photographing operation is performed according to a subjective method such as user's eye measure without displaying the guide image, the position guide and the panorama guide on the preview screen 210. Thus, as shown in FIGS. 19A-19C, the user is taking multiple photographs of a train traveling through the mountain side.

Then, the plurality of images are connected to construct a panorama picture through the image processor 129 (FIG. 5) and stored in the memory 160 (step S520). The controller 180 also displays the panorama picture on the preview screen 210 (step S530). Then, the controller 180 determines whether the panorama picture has an omitted part (step S540).

Figure 19D:
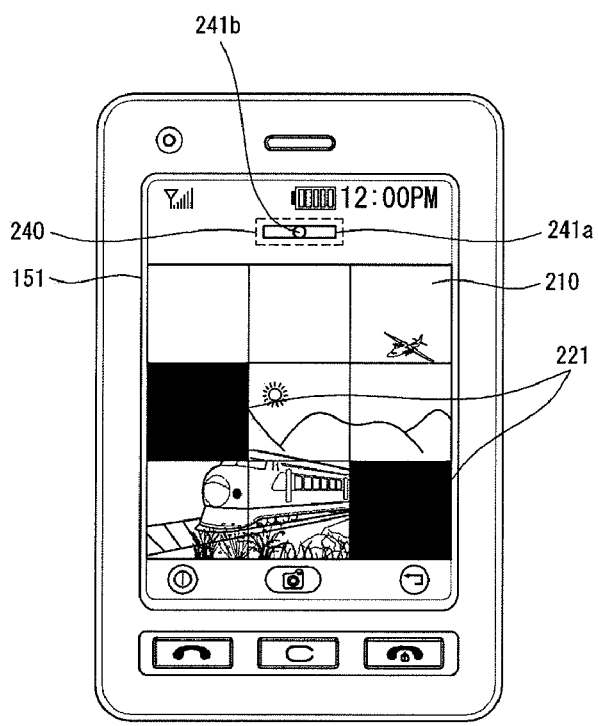

When the controller 180 determines the panorama picture has an omitted part (Yes in step S540), the controller 180 displays the omitted part on the preview screen 210 through a lattice guide 221, as illustrated in FIG. 19D (step S550). Subsequently, the user selects the lattice guide 221 through a touch operation (step S560) to display an image corresponding to the lattice guide 221 on the preview screen 210 (step S570). The displayed image corresponding to the lattice guide 221 is then photographed and stored (step S580).

After the omitted part of the panorama picture is additionally photographed, the panorama picture is stored in the memory 160 (step S590). Further, when the panorama picture has no omitted part (No in step S540), the controller 180 can directly store the panorama picture in the memory 160 (step S590). Therefore, the user can take a plurality of pictures subjectively and then additionally photograph an omitted part to easily acquire a panorama picture without using the guide image and the panorama guide.

Thus, the embodiments of the present invention provide several advantages. For example, a terminal user can photograph a plurality of pictures for constructing a panorama picture such that the plurality of pictures have improved picture continuity. The user can also be notified of a correct photographing position based on objective data without using a subjective method such as user's eye measure when photographing a panorama picture. In addition, the user can freely compose scenes for constructing a panorama picture.

The mobile terminal can also include a cellular phone, a smart phone, a laptop computer, a digital broadcasting terminal, personal digital assistants (PDA), a portable multimedia player (PMP), a navigation system and so on.

In addition, according to an embodiment of the present invention, the aforementioned method can be embodied as computer readable codes on a computer readable recording medium. The computer readable recording medium can be any data storage device that can store data which can be thereafter read by a computer system. Examples of the computer readable recording medium include a ROM, RAM, CD-ROM, magnetic tapes, floppy disks, optical data storage devices, and carrier waves (such as data transmission through the Internet). The computer can include the controller 180 of the terminal.

In addition, various embodiments of the present invention can be implemented in a computer or similar device readable recording medium using software, hardware or a combination thereof, for example.

According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
   a camera configured to capture images;
   a display configured to display a panorama guide including a lattice having at least two rows on a preview screen when a panorama photographing operation using the camera is performed;
   a sensor configured to sense a motion of the terminal; and
   a controller configured to:
   control the display to display a position guide indicating a photographing position of the terminal when performing the panorama photographing operation; and
   control the display to display a image guide including an edge region of a previously photographed image in an edge region of the preview screen,
   wherein the edge region of the previously photographed image corresponds to a camera angle rotation direction in the previously photographed image, and
   wherein the edge region of the preview screen corresponds to a direction opposite to the camera angle rotation direction in the preview screen.

2. The mobile terminal of claim 1, wherein the controller is further configured to mark one section of the lattice of the panorama guide that identifies a first photographed image of the panorama photographing operation.

3. The mobile terminal of claim 2, wherein the sensor is further configured to sense at least one of a horizontally state and forward-and-backward tilting state of the mobile terminal, and the position guide includes a predetermined horizontal guide indicating the sensed horizontally or forward-and-backward tilting state of the mobile terminal.

4. The mobile terminal of claim 3, wherein the controller is further configured to compare a sensed first horizontally state of the terminal in a position for photographing a first image to a sensed second horizontally state of the terminal in a position for photographing a second image, and to provide optical information through the displayed horizontal guide, and
   wherein the optical information represents a changing amount of the horizontally of the terminal between the sensed first and second horizontally states.

5. The mobile terminal of claim 3, wherein the controller is further configured to compare a sensed first tilting state of the terminal in a position for photographing a first image to a sensed second tilting state of the terminal in a position for photographing a second image, and to provide optical information through the displayed horizontal guide, and wherein the optical information represents a changing amount of the tilting of the terminal between the sensed first and second tilting states.

6. The mobile terminal of claim 2, wherein the controller is further configured to perform the panorama photographing in a clockwise or counterclockwise direction from the marked one section of the lattice that identifies the first photographed image of the panorama photographing operation.

7. The mobile terminal of claim 2, further comprising:
an input unit configured to receive, from a user of the terminal, an order of photographing images for performing the panorama photographing operation for constructing a panorama picture.

8. The mobile terminal of claim 1, wherein the controller is further configured to control the display to overlay the panorama guide on the preview screen.

9. The mobile terminal of claim 1, wherein the sensor is further configured to sense an acceleration value of the mobile terminal when the mobile terminal is moved from a position for photographing a first image to a position for photographing a second image included in the panorama photographing operation for photographing a panorama picture, and
wherein the controller is further configured to move a highlight from a first section of the lattice of the panorama guide indicating the first image to a second section of the lattice of the panorama guide in accordance with the sensed acceleration value.

10. The mobile terminal of claim 1, wherein the controller is configured to control the display to display the panorama guide, position guide and image guide simultaneously on the preview screen.

11. A method of controlling a mobile terminal, the method comprising:
displaying a panorama guide including a lattice having at least two rows on a preview screen when a panorama photographing operation using a camera on the terminal is performed;
sensing a motion of the terminal;
displaying a position guide indicating a photographing position of the terminal when performing the panorama photographing operation; and
displaying an image guide including an edge region of a previously photographed image in an edge region of the preview screen,
wherein the edge region of the previously photographed image corresponds to a camera angle rotation direction in the previously photographed image, and
wherein the edge region of the preview screen corresponds to a direction opposite to the camera angle rotation direction in the preview screen.

12. The method of claim 1, wherein the sensing step senses at least one of a horizontally state and forward-and-backward tilting state of the mobile terminal, and the position guide includes a predetermined horizontal guide indicating the sensed horizontally or forward-and-backward tilting state of the mobile terminal.

13. The method of claim 12, further comprising:
comparing a sensed first horizontally state of the terminal in a position for photographing a first image to a sensed second horizontally state of the terminal in a position for photographing a second image; and
providing optical information through the displayed horizontal guide, wherein the optical information represents a changing amount of horizontally of the terminal between the sensed first and second horizontally states.

14. The method of claim 12, further comprising:
comparing a sensed first tilting state of the terminal in a position for photographing a first image to a sensed second tilting state of the terminal in a position for photographing a second image; and
providing optical information through the displayed horizontal guide, wherein the optical information represents a changing amount of tilting of the terminal between the sensed first and second tilting states.

15. The method of claim 11, further comprising:
marking one section of the lattice of the panorama guide that identifies a first photographed image of the panorama photographing operation.

16. The method of claim 15, further comprising:
performing the panorama photographing in a clockwise or counterclockwise direction from the marked one section of the lattice that identifies the first photographed image of the panorama photographing operation.

17. The method of claim 11, wherein the displaying the panorama guide overlays the panorama guide on the preview screen.

18. The method of claim 11, further comprising:
setting, by a user of the terminal, an order of photographing images for performing the panorama photographing operation for constructing a panorama picture.

19. The method of claim 11, further comprising:
sensing an acceleration value of the mobile terminal when the mobile terminal is moved from a position for photographing a first image to a position for photographing a second image included in the panorama photographing operation for photographing a panorama picture; and
moving a highlight from a first section of the lattice of the panorama guide indicating the first image to a second section of the lattice of the panorama guide in accordance with the sensed acceleration value.

20. The method of claim 1, wherein the panorama guide, position guide and image guide are simultaneously displayed on the preview screen.

* * * * *